(12) United States Patent
Okamoto

(10) Patent No.: US 6,481,476 B1
(45) Date of Patent: Nov. 19, 2002

(54) METHOD OF MANUFACTURING ARTIFICIALLY FIGURED VENEER OR ARTIFICIALLY FIGURED BOARD

(75) Inventor: Susumu Okamoto, Tokyo (JP)

(73) Assignee: Hokusan Ltd., Tokyo (JP)

( * ) Notice: Subject to any disclaimer, the term of this patent is extended or adjusted under 35 U.S.C. 154(b) by 0 days.

(21) Appl. No.: 09/867,586

(22) Filed: May 31, 2001

(51) Int. Cl.$^7$ .................................................. B27D 1/00
(52) U.S. Cl. ....................... 144/350; 144/345; 156/62.2; 156/79; 156/244.11; 428/151; 428/161; 428/518; 428/910
(58) Field of Search .................................. 144/344, 345, 144/348, 349, 350; 156/39, 78, 79, 83, 86, 244.11, 244.12, 62.2; 428/15, 151, 332, 518, 910, 913

(56) References Cited

U.S. PATENT DOCUMENTS 4,136,224 A  *  1/1979  Minami et al. ............. 428/161
5,718,786 A  *  2/1998  Lindquist et al. .......... 156/62.2

* cited by examiner

Primary Examiner—W. Donald Bray

(74) Attorney, Agent, or Firm—Nath & Associates PLLC; Gary M. Nath; Marvin C. Berkowitz

(57) ABSTRACT

The present invention provides the method of manufacturing the artificially figured veneer or artificially figured board at high productivity with the expression of the grain and figure of natural wood in very similar form observed in natural woods, in addition to normal grain of natural wood.

The present invention relates to the method of manufacturing an artificially figured veneer or an artificially figured board, comprising the steps of 1) preparing a set of a multiple sheets of material veneers by rotary cutting a log or repeatedly cutting a wood flitch with their grains sequential, 2) embossing simultaneously said material veneers whose number was determined according to the static bending strength (proportional limit) and specific gravity of the material veneers, with press dies having concave-convex patterns corresponding to a site of figure of a natural wood, to form a concave-convex pattern on the material veneers, 3) laminating the set of embossed material veneers such that their grains become substantially sequential, and pressing it with said press dies, and 4) cutting the laminate in the direction crossing the plane of the lamination to manufacture an artificially figured veneer or an artificially figured board with desired thickness.

11 Claims, 19 Drawing Sheets

(6 of 19 Drawing Sheet(s) Filed in Color)

(a)

(b)

METHOD OF MANUFACTURING ARTIFICIALLY FIGURED VENEER OR ARTIFICIALLY FIGURED BOARD

The present invention relates to a method of manufacturing an artificially figured veneer or an artificially figured board, and in detail, to a method of efficiently manufacturing an artificially figured veneer or an artificially figured board with a design similar to the figure observed in a natural wood.

Besides, the present invention relates to an artificially figured veneer or an artificially figured board manufactured according to said method.

BACKGROUND OF THE INVENTION

In general, an artificially figured veneer is manufactured by laminating multiple sheets of material veneers as row material with adhesives and hot pressing them, and then cutting the laminate again so as to obtain a collected veneer with desired thickness.

Up to the present, according to this method of manufacturing, an attempt has been made to prepare an artificially figured veneer with an inexpensive veneer as a material veneer made to appear fancy wood veneer having high market value. For example, an artificially figured veneer with grain of Japanese cedar is made from veneers of Agathis as the row material.

In this case, in order to make an artificially figured veneer so well as to confuse with a natural fancy wood veneer, it is required to faithfully express textures, vessels, grains, etc, which a fancy wood veneer ordinary may have.

Therefore, various methods such as bleaching and coloring of material veneers, specific process of applying an adhesive (to form non-uniform films), insertion of colored papers (resin impregnated papers) between veneers, etc. have been proposed up to present. These proposals are disclosed in, for example, Japanese Patent Laid-Open No. Sho 57-156203, Japanese Patent Laid-Open No. Sho 59-220305 and Japanese Patent Laid-Open No. Sho 57-150503, etc.

However, the artificially figured veneers prepared by these techniques lacked natural feeling, and it could not say that those faithfulness and reproducibility about grains, textures, etc of natural woods were not sufficiently (completely) met.

Further, the artificially figured veneers which are made from material veneers optionally collected various veneers of different kinds of wood with different grains and colors are on the market. Typical example is shown schematically on FIG. 21. Each part of veneer 15 (the parts between the curve of a grain and adjacent curve) was made up of various kinds of wood materials with different textures, and no consideration is given how faithfully specific grain, texture, etc. of a natural wood have been expressed in this type of an artificially figured veneer. As a result, this type of artificially figured veneers bear no resemblance to veneers of natural fancy wood.

By the way, unique pattern so called "figure" is sometime formed in the grain of natural woods. Principal figures known among artisans are such as quilted figure, bird's-eye figure, peony (BOTAN) figure, quail (UZURA) figure, grape (BUDO) figure, NYORIN figure, bamboo grass (SASA) figure, etc.

The veneers with quilted figure, bird's-eye figure, etc. are recognized as those having higher value in design and artistic handicraft, and have significantly higher market value than the veneers of same kind of wood without any figure.

FIG. 22 is schematic drawing illustrating a typical example of an artificially figured veneer made resemble to quilted figures observed in a natural wood. For an artificially figured veneer shown in said figure, simply collecting many parts of veneers 15 made from wood materials of different textures is made to resemble the grain curve of a quilted figure, and the grain of such artificially figured veneer is not similar to the grain of a natural fancy wood, and further a design of a quilted figure of natural fancy wood is not expressed faithfully.

As described above, it was difficult to faithfully express the grains of especially high value in design and artistic handicraft, e.g. quilted figure, bird's-eye figure, etc. observed in natural woods.

As for the method of manufacturing an artificially figured veneer faithfully expressing a figure in the form observed in natural woods in addition to normal grains of a natural wood from natural wood without figures, the method disclosed in Japanese Patent Laid-Open No. Hei 9-123110 may be mentioned.

According to said method, it is possible to express a grain on an artificially figured veneer of artificially figured board with very similar form of a figure observable in natural woods, by 1) preparing a set of multiple sheets of material veneers by rotary cutting a log or repeatedly cutting a wood flitch, wherein said multiple sheets of material veneers are of the same kind of wood and their grains are sequential,
2) embossing concave-convex patterns on every material veneers with press dies respectively having concave-convex patterns corresponding to a site of figure observed in a natural wood on both upper and lower faces of die,
3) laminating the set of thus embossed multiple sheets of material veneers such that their grains again become sequential with adhesive layer interposed between each material veneers, and pressing the laminate between the upper and the lower press dies, and
4) cutting the laminate obtained in the direction crossing the plane of the lamination to manufacture an artificially figured veneer or an artificially figured board with desired thickness.

However, it is required to emboss the material veneer one by one when the material veneer are embossed to form concave-convex pattern, thus said method has the problem in low productivity.

In order to improve productivity, it is useful to emboss multiple sheets of material veneers simultaneously. But simple simultaneous embossing of multiple sheets of material veneers can not achieve uniform embossing of all materiel veneers, and as a result, the problem may occur in which voids may be observed between the set of material veneers embossed simultaneously and the adjacent set of material veneers when laminated after embossing. Said voids not only become harmful on faithful expression of a grain and a figure but also cause failure in adhesion of material veneers, and significantly decrease the strength of an artificially figured veneer.

The present invention is achieved in consideration for the prior art, and its subject is to provide a method of manufacturing an artificially figured veneer or an artificially figured board, which is enable to easily and faithfully express figures in the form of those observed in nature in addition to normal grains of natural woods from the natural wood without figures with high productivity.

Another subject of the present invention is to provide an artificially figured veneer or an artificially figured board manufactured in the method of manufacturing therewith according to the method described.

SUMMARY OF THE INVENTION

The inventors carried out intensive investigation. As a result, it is found that all material veneers are uniformly embossed where multiple sheets of material veneers are simultaneously embossed by paying attention to the static bending strength (proportional limit) and specific gravity of the material veneers and determining the number of veneers to be embossed simultaneously according to theses value. The material veneers uniformly embossed produce no void between material veneers when laminated. And, simultaneous embossing of multiple sheets of material veneers leads to great improvement in the productivity of an artificially figured veneer compared to a prior method.

Therefore, the present invention relates to the method of manufacturing an artificially figured veneer or an artificially figured board, comprising the steps of 1) preparing at first a set of multiple sheets of material veneers by rotary cutting a log or repeatedly cutting a wood flitch from the certain kind of wood, wherein said multiple sheets of material veneers are of the same kind of wood with their grains sequential,
2) embossing concave-convex patterns simultaneously on said multiple sheets of material veneers whose number was determined according to the static bending strength (proportional limit) and specific gravity of the material veneers, with a pair of upper and lower press dies respectively having concave-convex patterns corresponding to a site of figure of a natural wood on both upper die and lower faces of die,
3) laminating the set of thus embossed multiple sheets of material veneers such that their grains again become sequential with the adhesive layer interposed between each material veneers, and pressing the laminate between the upper and the lower press dies, and
4) cutting the laminate obtained by the pressing in the direction crossing the plane of the lamination to manufacture an artificially figured veneer or an artificially figured board with desired thickness.

Relationship between static bending strength (proportional limit) and specific gravity of the material veneers and the number of veneers to be embossed simultaneously is concretely as follows;

In the case of specific gravity $\leq 0.49$

If static bending strength (proportional limit)$\leq 330$ kg/cm$^2$, then 3–6 sheets, If static bending strength (proportional limit)$\geq 330$ kg/cm$^2$, then 4–10 sheets.

In the case of 0.49 $\leq$ specific gravity$\leq 0.61$

If static bending strength (proportional limit)$\leq 400$ kg/cm$^2$, then 3–6 sheets, If 400 kg/cm$^2$$\leq$static bending strength (proportional limit)$\leq 540$ kg/cm$^2$, then 3–8 sheets, If static bending strength (proportional limit)$\geq 540$ kg/cm$^2$, then 4–8 sheets.

In the case of 0.61$\leq$specific gravity$\leq 0.75$

If static bending strength (proportional limit)$\leq 540$ kg/cm$^2$, then 2–5 sheets, If 540 kg/cm$^2$$\leq$static bending strength (proportional limit)$\leq 710$ kg/cm$^2$, then 3–6 sheets, If static bending strength (proportional limit)$\geq 710$kg/cm$^2$, then 3–8 sheets.

In the case of specific gravity$\geq$0.75

If static bending strength (proportional limit)$\leq 820$ kg/cm$^2$, then 2–3 sheets, If static bending strength (proportional limit)$\geq 820$ kg/cm$^2$, then 2–6 sheets.

Thus, the present invention also relates to the method of manufacturing an artificially figured veneer or an artificially figured board described above, wherein, in step 2, 3–6 sheets of the material veneers are embossed simultaneously when static bending strength (proportional limit) of said material veneers is below 330 kg/cm$^2$, and 4–10 when it is above 330 kg/cm$^2{}_1$ in case their specific gravity are below 0.49, the method of manufacturing an artificially figured veneer or an artificially figured board described above, wherein, in step 2, 3–6 sheets of the material veneers are embossed simultaneously when static bending strength (proportional limit) of said material veneers is below 400 kg/cm$^2$, 3–8 when it is above 400 kg/cm$^2$ and below 540 kg/cm$^2$, and 4–8 when it is above 540 kg/cm$^2$, in case their specific gravity are above 0.49 and below 0.61, the method of manufacturing an artificially figured veneer or an artificially figured board described above, wherein, in step 2, 2–5 sheets of the material veneers are embossed simultaneously when static bending strength (proportional limit) of said material veneers is below 540 kg/cm$^2$, 3–6 when it is above 540 kg/cm$^2$ and below 710 kg/cm$^2$, and 3–8 when it is above 710 kg/cm$^2$, in case their specific gravity are above 0.61 and below 0.75, and the method of manufacturing an artificially figured veneer or an artificially figured board described above, wherein, in step 2, 2–3 sheets of the material veneers are embossed simultaneously when static bending strength (proportional limit) of said material veneers is below 820 kg/cm$^2$, and 2–6 when it is above 820 kg/cm$^2$, in case their specific gravity are above 0.75.

In the method for manufacturing, multiple sheets of material veneers is embossed with a pair of upper and lower press dies. At the time of embossing, pressure may be applied at once or stepwise up to predetermined level.

Therefore, the present invention relates to the method of manufacturing an artificially figured veneer or an artificially figured board described above, wherein, in step 2, the pressure is increased continuously up to predetermined level to emboss the material veneers, and the method of manufacturing an artificially figured veneer or an artificially figured board described above, wherein, in step 2, the pressure is increased stepwise up to predetermined level to emboss the material veneers.

At the time of embossing the material veneers, there is a case in which concave-convex pattern of press dies is transformed well to the surface of said material veneer by embossing with a cushioning material interposed between said material veneers and said press die.

Thus, the present invention further relates to the method of manufacturing an artificially figured veneer or an artificially figured board described above, wherein, in step 2, the material veneers are embossed with cushioning material interposed between said material veneers and said press die.

The method of manufacturing described above uses a set of multiple sheets of material veneers obtained from wood flitch of the same kind of wood as the raw material, but it is also expected that, when a set of multiple sheets of material veneers obtained from wood flitch with similar wood texture of specific family or specific species in place of such wood flitch is used as row material, the same effect can be achieved as the method of manufacturing described above.

Namely, above mentioned method of manufacturing can be applied to not only the case using material veneers of the same kind of wood but also the case using material veneers of specific family or specific species.

Therefore, the present invention also relates to the method of manufacturing an artificially figured veneer or an artificially figured board, comprising the steps of
1) preparing a set of multiple sheets of material veneers by rotary cutting a log or repeatedly cutting a wood flitch of wood of certain family or certain species, wherein said multiple sheets of material veneers have similar textures with their grains substantially sequential,
2) embossing concave-convex patterns simultaneously on said multiple sheets of material veneers whose number was determined according to the static bending strength (proportional limit) and specific gravity of the material veneers, with a pair of upper and lower press dies respectively having concave-convex patterns corresponding to a site of figure of a natural wood on both upper and lower faces of die,
3) laminating the set of thus embossed multiple sheets of material veneers such that their grains again become substantially sequential with adhesive layer interposed between each material veneers, and pressing the laminate between the upper and the lower press dies, and
4) cutting the laminate obtained by the pressing in the direction crossing the plane of the lamination to manufacture an artificially figured veneer or an artificially figured board with desired thickness.

Further, the present invention addresses the subject of an artificially figured veneer or an artificially figured board manufactured by the method according to any one of methods described above.

BRIEF DESCRIPTION OF THE DRAWINGS

The file of this patent contains at least one drawing executed in color. Copies of this patent with color drawing(s) will be provided by the Patent and Trademark office upon request and payment of the necessary fee.

DETAILED DESCRIPTION OF THE INVENTION

Figure 1:
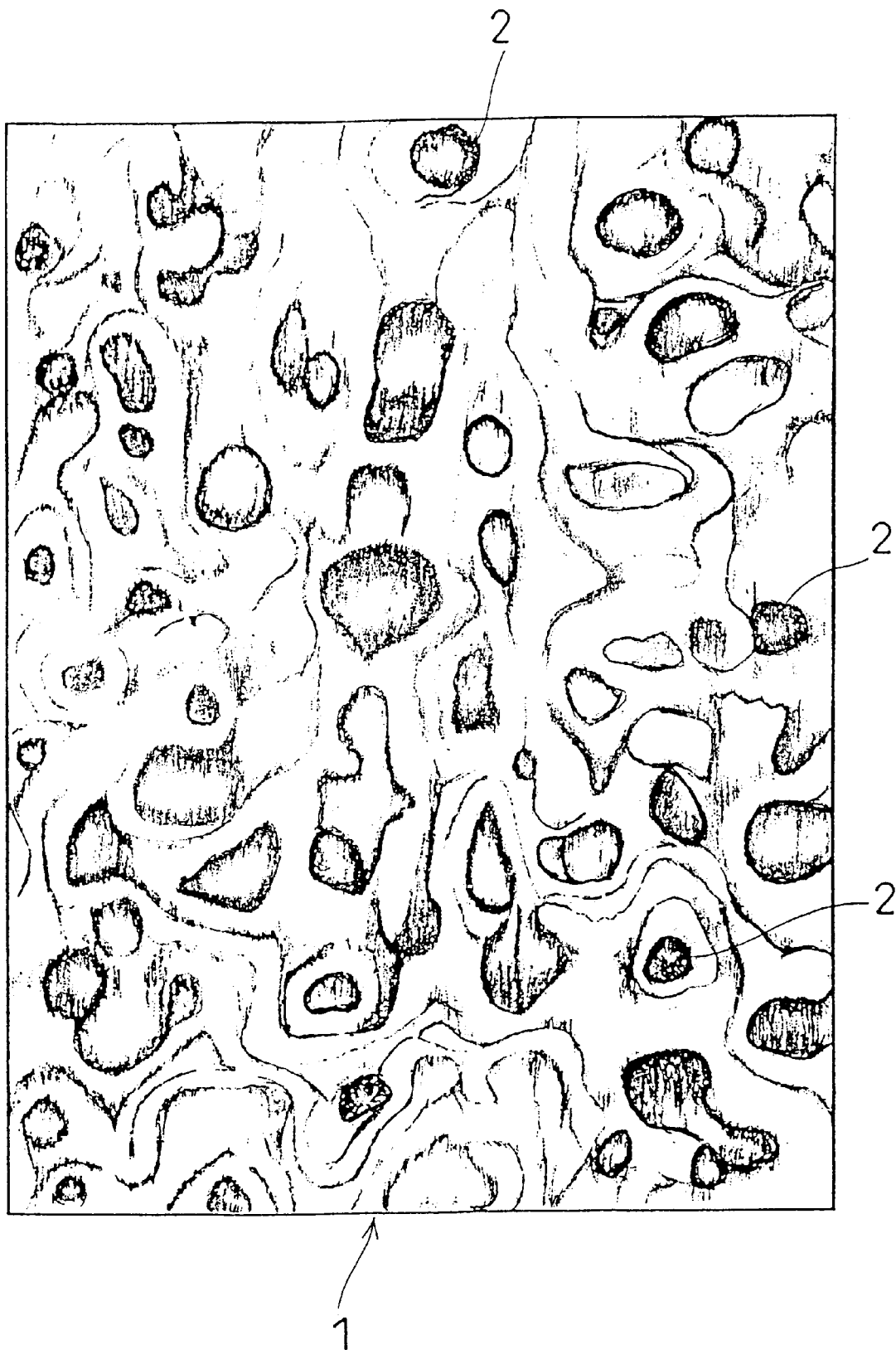
FIG. 1 is a schematic drawing of the artificially figured veneer with quilted figures manufactured according to Example 1 of the present invention.

In general, when the load is light, there is linear relationship between the load applied to the wood and the amount of vent of the wood caused by the load. However, when the load is increased gradually and exceeds a certain value, the load applied to the wood is not in proportion to the amount of vent of the wood, and if the load is further increased to exceed the maximum value up to which the wood can resist, then the wood is broken.

"Static bending strength (proportional limit)" in the present invention is measured according to JIS Z 2113 and means the value derived from the following formula, wherein P is the maximum value of the load at the time when there is linear relationship between the load applied to the wood and the amount of vent of the wood caused by the load.

$$\text{Static bending strength } (M) = \frac{Pl}{4Z} \text{ (kg/cm}^2\text{)}$$

P: maximum load (kg)
L: span (cm)
Z: modulus of section (cm$^2$)

In general, the higher the static-bending strength (proportional limit) of the material veneer is, the more flexible and pliable the material veneer is, thus the more material veneers can be embossed simultaneously. Conversely, when the static bending strength (proportional limit) of the material veneer is low, the material veneer is friable and easy to break, thus it is required that the embossing of the material veneers is done with a small number of sheets.

"Specific gravity" described in the present invention refers to the value measured according to JIS Z 2102. Almost all of woods have the specific gravity in the region of 0.35 to 1.05.

In general, the higher the specific gravity of the material veneer is, the denser the structure of the material veneer is, thus it is required that the embossing of the material veneers is done with a smaller number of sheets. Conversely, when the specific gravity is low, many material veneers can be embossed simultaneously.

In the following, the each steps of the method of manufacturing an artificially figured veneer or an artificially figured board according to the present invention is described in detail.

-As for Step 1)-

This is the step of preparing a set of multiple sheets of material veneers by rotary cutting a log or repeatedly cutting a wood flitch, wherein said multiple sheets of material veneers are of the same kind of wood with their grains sequential. In one method, a set of material veneers is prepared by rotary cutting a log or repeatedly cutting a wood flitch of the certain kind of wood, and placing them in order of cutting In another method, a set of material veneer with similar textures is prepared by rotary cutting a log or repeatedly cutting a wood flitch of wood of certain family or certain species, and placing them in order such that their grains are substantially sequential.

In the step 1), the material veneers are optionally dried after cutting them. For example, such drying is carried out with high frequency vacuum dryer. When the drying is carried out in low temperature (about 50 C▯), the material veneers can be kept flat during drying, thus so-called "warp" dose not occur.

-As for Step 2)-

This is the step of embossing simultaneously the multiple sheets of the material veneers with a pair of upper and lower press dies.

As the press dies, a pair of upper and lower press dies respectively having concave-convex patterns corresponding to a site of figure of a natural wood on both upper and lower faces of die is used.

This type of press dies is manufactured by, for example, pouring a melted or liquid silicon resin on a natural wood with a figure, e.g. quilted figure, bird's-eye figure, etc, solidifying it, then forming a concave-convex pattern corresponding to a site of the figure on the face of the form of the solidified silicon resin, preparing a model of an upper die and a lower die which may be made of a plaster model or a synthetic resin (epoxy resin) model, etc. by using the silicon resin form so obtained as the master model, and further casting with such model. By changing the concave-convex patterns formed on the face of the die face of the press die, various figures can be reproduced. For example, a quilted figure with the concave-convex patterns of long island-shaped projection and hole can be reproduced, and bird's-eye figure can be reproduced with small projection and hole with the size of red beans.

Embossing of material veneers is carried out by placing material veneers, optionally veneer somewhat wetted with water spraying, between the pair of upper and lower press dies described above, and hot pressing them under the condition that, for example, of temperature about 150° C. for about 20 seconds.

By such embossing, the concave-convex pattern corresponding to the site of the figure on a natural wood is formed uniformly on the all of material veneers embossed simultaneously.

In said embossing, there are two manner to increase pressure applied to each material veneers up to the predetermined pressure level. Namely, 1) the manner in which predetermined pressure level is achieved while the increasing amount of the pressure is kept constant, and 2) the manner in which the increasing amount of pressure is varied, and predetermined pressure level is achieved stepwise.

Figure 18:
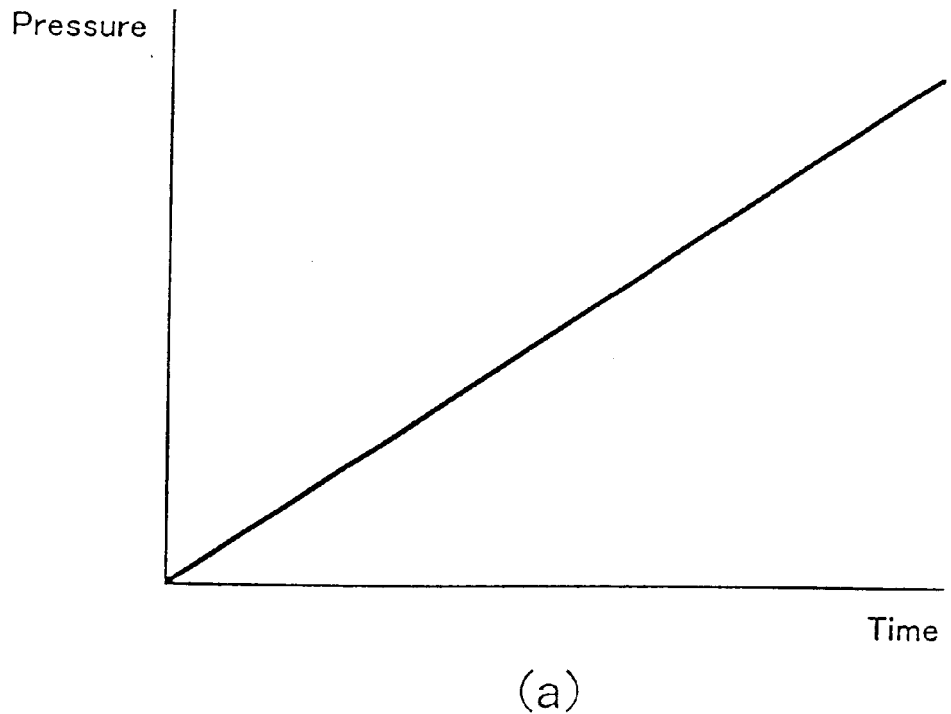
FIG. 18 is a graph showing the relationship between pressure and time at the embossing of the material veneer (a) in the case that pressure is increased constantly, and (b) in the case of that pressure is increased stepwise.
Figure 18:
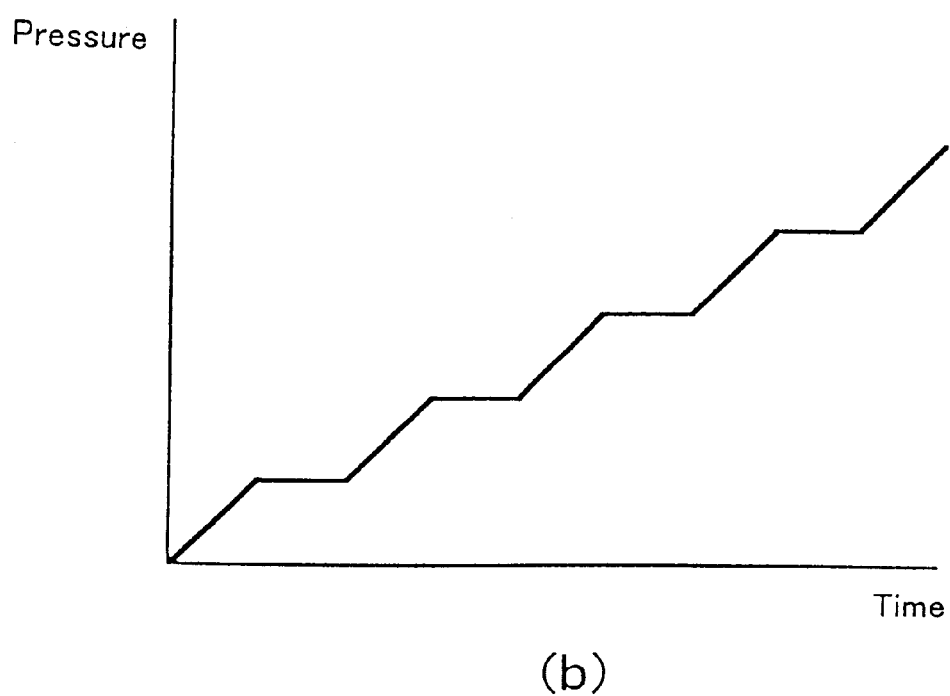

FIG. 18 is a graph schematically illustrating the manner of the application of pressure for embossing, and the ordinate indicates pressure and the abscissa indicates time. FIG. 18(a) illustrates the manner of the application of pressure where the increasing amount of pressure is not changed, and the pressure is increased constantly (one-time press). In this case, there is a linear relationship between pressure and time, thus the graph becomes linear. On the other hand, FIG. 18(b) illustrates the manner of the application of pressure where the increasing amount of pressure is changed, and the pressure is increased stepwise. In this case, the graph illustrating the relationship between pressure and time become a step-like shape with the duration in which pressure is increased and the duration in which pressure is kept constant. The number of steps to increase the pressure is optional matter, but, for example, five-time press with five duration to increase the pressure may be employed. Also, it may be useful to employ the process of first applying the pressure up to the predetermined pressure level, reducing the pressure once, and then applying the pressure up to the predetermined pressure level again, because when the gas is produced from the wood material with application of pressure, such gas can be removed. In addition, it may be possible to combine one-time press and multi-times press as well as application and reduction in pressure.

It is preferred that embossing is carried out through cushioning materials interposed between the press dies and the material veneers in said embossing. There is no specific limitation about the material, the thickness, etc. of the cushioning material, but it is preferred to use the silicon sheet with thickness of 1–2 mm as the cushioning material. Such cushioning material may be interposed between the material veneer and either the upper die or the lower die, or between the material veneer and both upper and lower dies. In the case that the cushioning material is interposed on both upper die and lower die, the thickness of the cushioning material for both upper and lower one may be varied.

In embossing of the present invention, the number of the material veneers to be embossed depends on the static bending strength (proportional limit) and specific gravity of the material veneers.

In general, as for the material veneer, the higher the static bending strength (proportional limit) is and the lower the specific gravity is, the more material veneers can be embossed simultaneously. Conversely, when the static bending strength (proportional limit) is low and the specific gravity is high, it is required that embossing of the material veneers has to be done with fewer sheets.

When the specific gravity is below 0.49, 3–6, preferably 4–5, the material veneers can be embossed simultaneously if static bending strength (proportional limit) is below 330 kg/cm$^2$, and 4–10, preferably 6–8 if it is above 330 kg/cm$^2$.

Also, when the specific gravity is above 0.49 and below 0.61, the number is 3–6, preferably 4–5 when static bending strength (proportional limit) is below 400 kg/cm$^2$, 3–8, preferably 5–6 when it is above 400 kg/cm$^2$ but below 540 kg/cm$^2$, and 4–8, preferably 5–7 if it is above 540 kg/cm$^2$; when the specific gravity is above 0.61 but below 0.75, the number is 2–5, preferably 3–4 if static bending strength (proportional limit) is below 540 kg/cm$^2$, 3–6, preferably 4–5 if it is above 540 kg/cm$^2$ but below 710 kg/cm$^2$, and 3-8, preferably 5–6 if it is above 710 kg/cm$^2$; when the specific gravity is above 0.75, the number is 2–3 if static bending strength (proportional limit) is below 820 kg/cm$^2$, and 2–6, preferably 3–5, if it is above 820 kg/cm$^2$.

-As for Step 3)-

This is the step of laminating the set of the embossed multiple sheets of material veneers such that their grains become completely or substantially sequential with adhesive layer interposed between each material veneers, placing the laminate between the upper and the lower press dies used in previous step, and then pressing it.

As the adhesive used in this step, the organic solvent type adhesive (free of water) is preferred. If the water content of the adhesive at use is high, variation in dimension of the material veneers embossed becomes significant, and thus the grain becomes non-matching on the surface of the artificially figured veneer finally obtained. Conversely, when the solvent type adhesive free of water is used, such problem dose not occurred.

Further, in respect to faithful reproduction of the color and texture of the cross section of the kind of the wood employed, more preferred adhesive is one which is transparent and hard to yellow with time.

Because of reasons described above, particularly preferred adhesive is two-liquid curing type urethane adhesive or one-liquid moisture curing type urethane adhesive. The amount of adhesive to be applied is optional matter, but it is preferred to use about 55–88 $g/m^2$. The application of adhesive is carried out by using sponge roll coater, curtain flow coater, etc.

Further, the pressing of the laminate of the material veneers so embossed (wherein their grains are sequential) is carried out by cold pressing with the pressure at 15–40 $kg/cm^2$ for 6–12 hours. Hot press at suitably elevated temperature may be employed in place of cold press,.

-As for Step 4)-

This is the step of cutting the laminate obtained by pressing described above in the direction crossing the plane of laminating the laminate of a veneer with a desired thickness (thickness of about 0.2–0.5 mm) or a board (thickness of about 1–10 cm). For the cutting work in this case, veneer cutting machine such as veneer slicer and half-round veneer lathe is employed. The direction of cutting the laminate is optional matter as long as the direction crossing the plane of the lamination is kept, so the direction may be perpendicular to the plane of the lamination or at an angle of 5–15°;

The artificially figured veneer and the artificially figured board are thus manufactured. Particular, as the artificially figured board is thicker product and it gives the impression to customers as if it is thick board of a natural wood, thus they are more useful when fancier impression is needed on the products.

The kind of the woods used in the present invention is optional matter, but the kind of woods with a figure is used more preferably. For example, depending on the use of the veneer decorative material, the taste of the customers, etc., it may be selected from the kind of the wood listed below; Domestic wood: Japanese larch, Japanese cedar (Cryptomeria), Japanese cypress, Japanese oak, Japanese zelkova, Japanese cherry, Japanese elm, Japanese persimmon, mulberry, Japanese horse-chestnut, Japanese maple, Japanese camphor tree, Cercidiphyllum, Sophara, Phellodendron, Spaeth's ash, Manchurian ash, Japanese thuja, Pinus Densiflora, Imported wood: American sycamore, Indian rosewood, Teak, Mahogany, African mahogany, Lauans (Dark red meranti, yellow meranti, white meranti), Ebony, Kranghunf, American black walnut, Narra, Zebra wood, Manggasinoro, Brazilian rosewood, Persimon, Southern silky oak, Angeria, Formosan camphor tree, American cherry, Myrtle, Dao, Guimea walnut, Sapelli, Bubinga, Makore, Madtora, Soft maple, Hard maple, Claro walnut, White ash, Aspen, Bathwood.

As particularly preferred, those with a quilted figure (Japanese zelkova, Manchurian ash, Mulberry, Japanese camphor tree, etc.), those with a bird's-eye figure (Maple), those with quail (UZURA) figure (Cryptomeria, Japanese arbor-vitae etc.), those with a grape (BUDO) figure (Japanese camphor tree, Manchurian ash, etc.), those with a ribbon figure (African mahogany, Lauans, etc.), those with a bamboo grass (SASA) figure (Japanese cedar, etc.), those with a peony (BOTAN) figure (Japanese zelkova, Manchurian ash, Mulbery, Japanese raisin tree, etc.), those with a NYORIN figure (Japanese zelkova, Manchurian ash, Machilus, etc.), those with a crab (KANI) figure (Pinus Densiflora, etc.) can be mentioned.

The artificially figured veneer manufactured according to the present invention may be used as they are, but it may also be used in the form of the artificially figured veneer sheet after backing with fibrous sheet such as a paper and a non-woven fabric or synthetic resin film.

Examples of the paper used are Japanese paper, imported paper (medium-grade paper, high-grade paper, etc.), board paper (Kraft paper) and resin-impregnated paper. For the non-woven fabric, examples are those made from raw material fibers of rayon, nylon, polyester, acryl, polyethylene, vinylon, cupra, polypropylen, etc.

The example for the synthetic resin film used are those made of synthetic resin such as chain polyolefin (polyethylene or polypropylene), cyclic polyolefin, acrylic resin, polyvinyl chloride (including copolymers thereof), etc.

Further, the artificially figured veneer manufactured according to the present invention may be used as a surfacing material of a wood laminate, and particularly, it is preferred to use as the surface material for the two kind of laminates described below.

1) Laminate composed of artificially figured veneer/paper or non-woven fabric/synthetic resin film/paper or non-woven fabric.

Examples for the synthetic resin film are those made of synthetic resin such as chain polyolefin (polyethylene or polypropylene), cyclic polyolefin, acrylic resin, polyvinyl chloride (including copolymers thereof), etc. and, for the paper and the non-woven fabric, the same as described above may be used in said laminate.

2) Laminate composed of artificially figured veneer/paper or non-woven fabric/synthetic resin film/metal foil/synthetic resin film/paper or non-woven fabric.

Those may be used for the metal foil are iron foil, aluminum foil, stainless steel foil, and, for the paper or the non-woven fabric and synthetic resin, the same as described above may be used in said laminate.

Further, the artificially figured veneer or the artificially figured veneer sheet of the present invention may also be bonded to substrates listed below to form various wood-based products.

Flexible Thick Fibrous Sheet

This fibrous sheet is made of thick, and flexible and pliable material, and one with cushioning property is suited. As the row material of the sheet, for example, imported paper, Japanese paper, board paper, woven fabric and non-woven fabric may be used.

Foamed Resin Sheet

As the foamed resin sheet, foamed polyurethane and foamed polystyrene may be used, but foamed polystyrene is particularly preferred.

Plywood

As the Plywood, those with three layers or five layers customary used in the prior art may be used.

Medium Density Fiber Board

The medium density fiber board has no specific limitation in regard to fiber type, density, etc.

Inorganic Board

As the inorganic board, volcanic silicate's fiber reinforced multi-layer board, gypsum board, calcium silicate board, fiber-incorporated calcium silicate board, fiber-incorporated gypsum board, glass fiber-incorporated foamed board of inorganic and phenolic resin, phenolic resin foamed board incorporated with glass fiber aluminum hydroxide, and formed concrete.

Glass Plate

Those made of plate glass are preferable because of its flat surface.

Synthetic Resin Board

As the synthetic resin board, those made of melamine resin, ABS resin, polyurethane resin, epoxy resin, acryl resin, etc. may be used. Further those formed from wood, etc. impregnated with epoxy resin, etc. may be used as well.

The artificially figured veneer and the artificially figured veneer of the present invention thus manufactured as well as the artificially figured veneer sheet made of them, wood-based laminate and wood-based product are novel decorative materials. They may be used usefully as the interior decorating materials such as ceiling, wall and floor of wood buildings and concrete buildings, and also as the surface covering material for furniture, household, daily needs, appliances (e.g. cabinet) and office equipment, and further as the material for the interior of transportation facilities such as automotive instrument panels and as the surfacing material for musical instruments.

EXAMPLES

In the following, the present invention will be more clearly described by means of some examples seemed to be the best modes of the present invention.

Example 1

Figure 2:
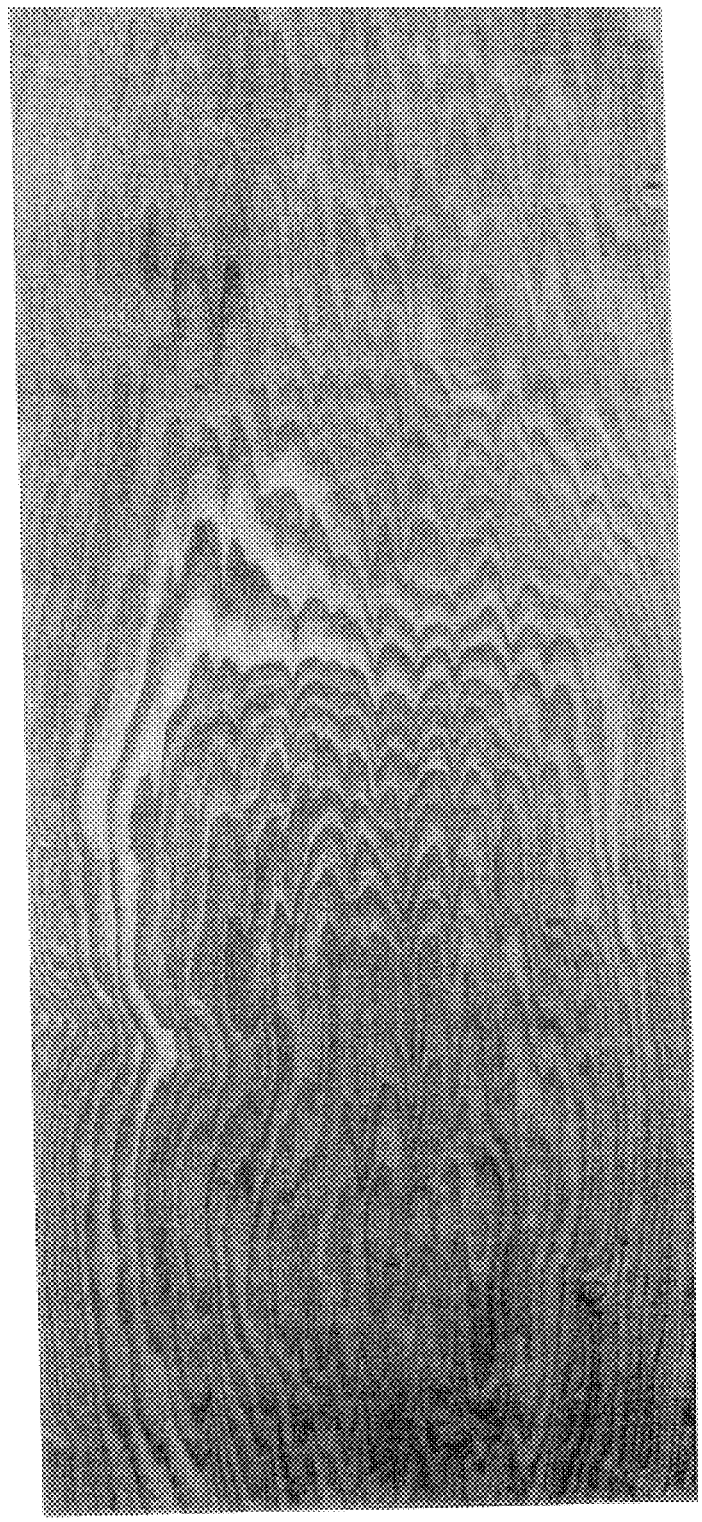
FIG. 2 is a photograph of the surface of the material veneer (species: Manchurian ash) used in the method according to Example 1.
Figure 3:
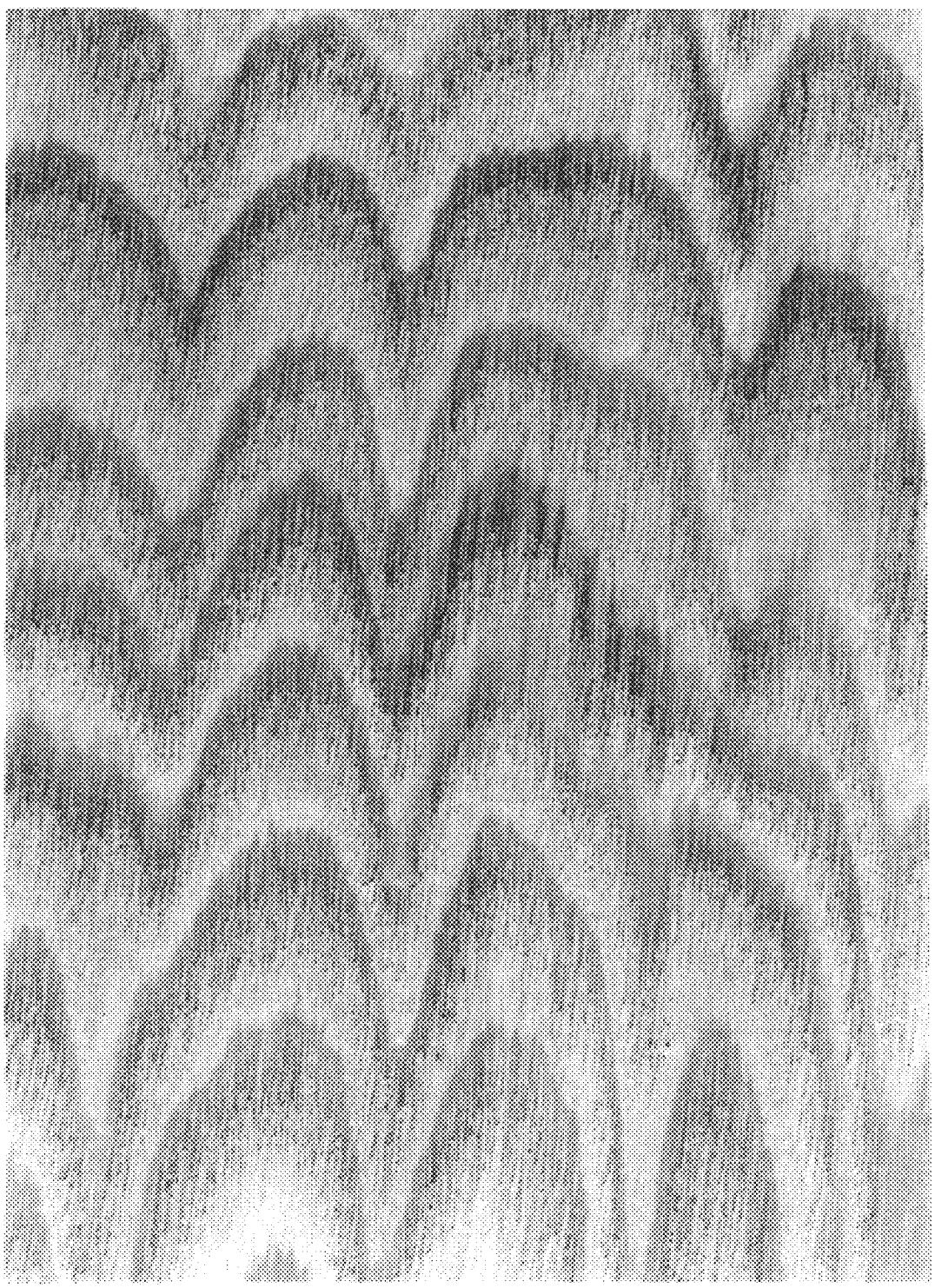
FIG. 3 is a magnified photograph of the surface of the material veneer used in the method according to Example 1.
Figure 4:
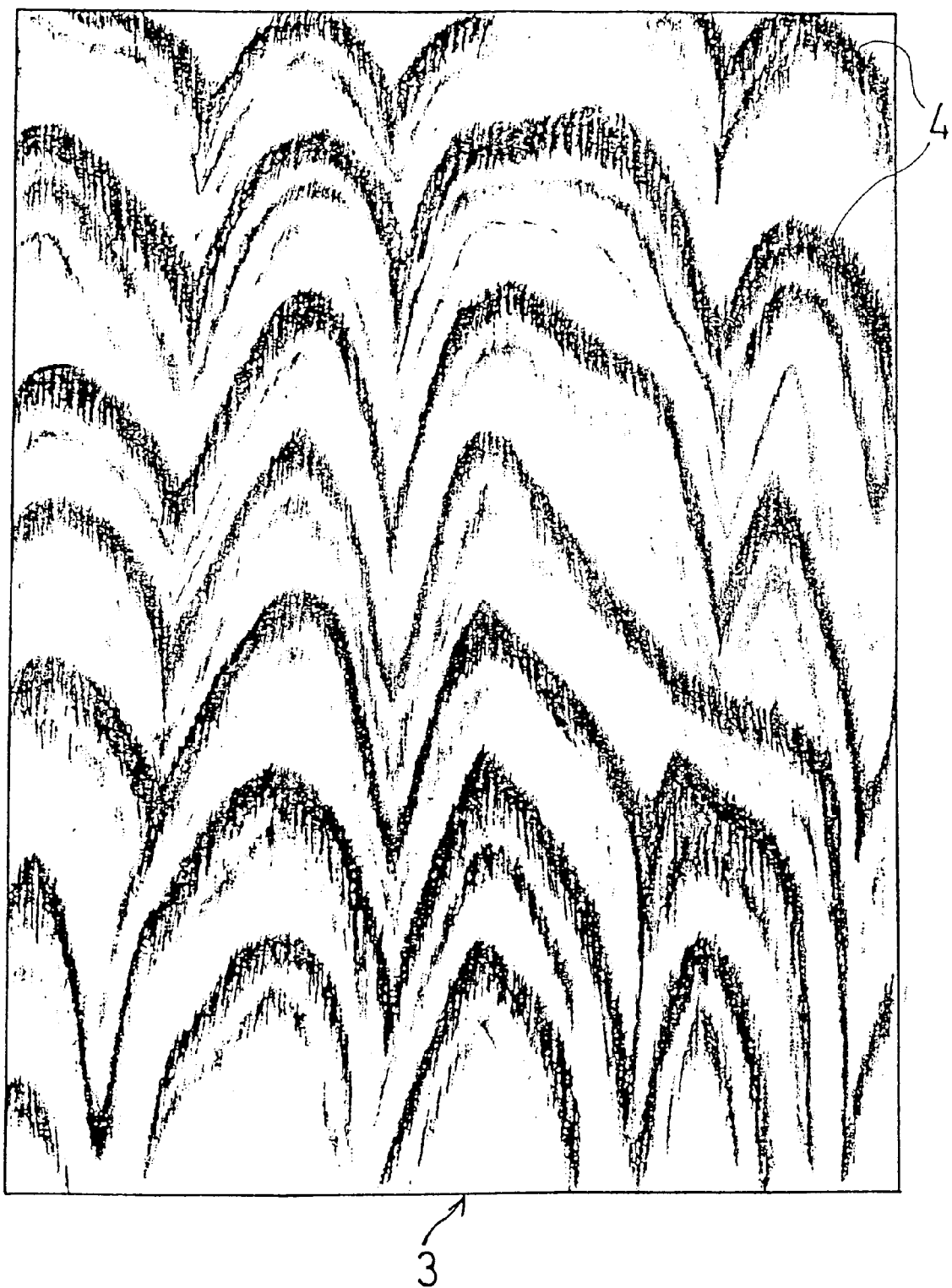
FIG. 4 is schematic drawing illustrating the surface of the material veneer used in the method according to Example 1.
Figure 5:
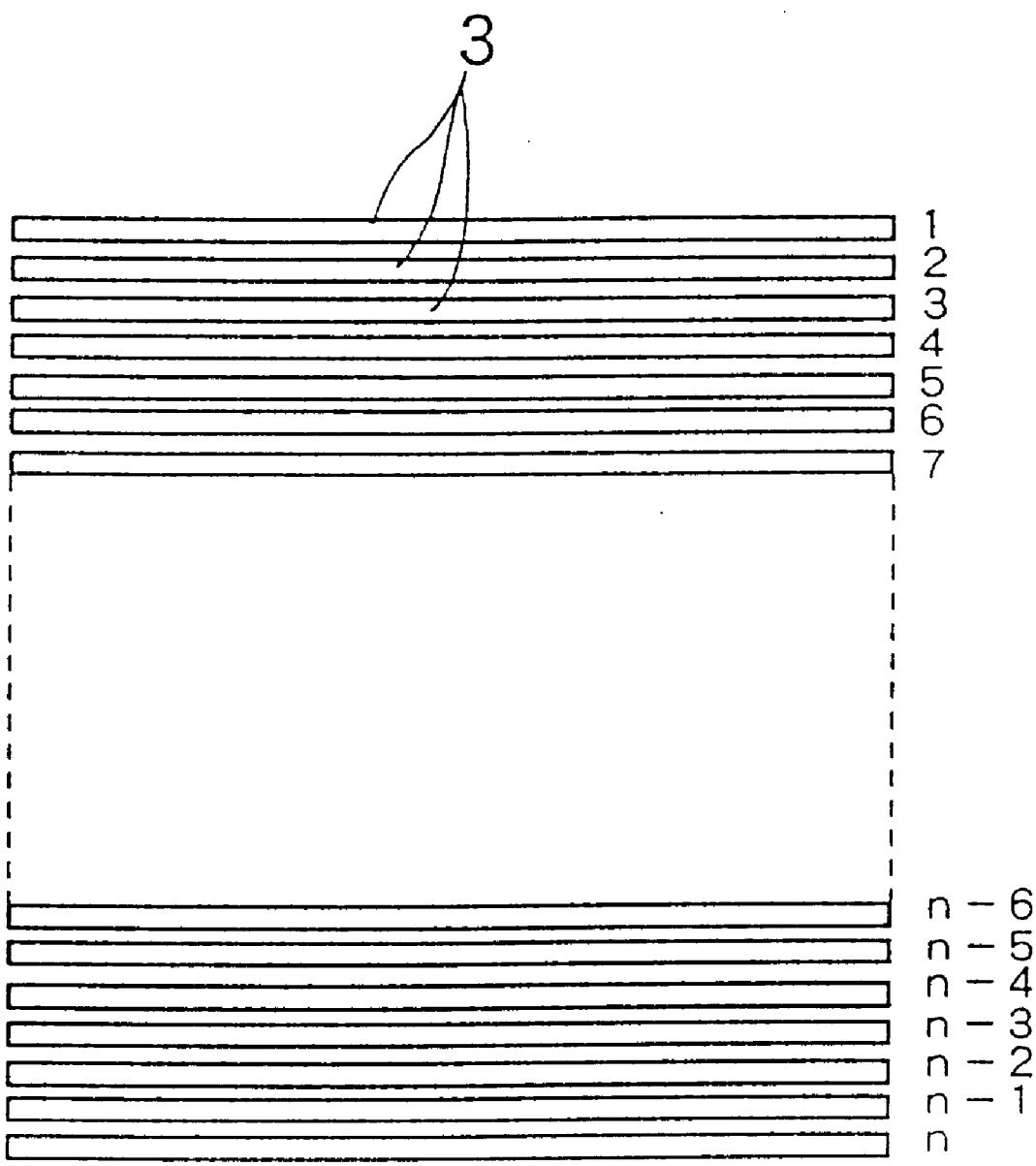
FIG. 5 is schematic drawing illustrating the set of the material veneers in the method according to Example 1.

This example is to manufacture the artificially figured veneer 1 with quilted FIGS. 2 as illustrated in FIG. 1 from the wood flitch without figures on its surface. Namely, this example tries to express the grain with the figure of a natural fancy wood on the artificially figured veneer. The details of the method of manufacturing are as follows.

-Step 1)-

The wood (species: Manchurian ash) without figures on its surface was supplied as raw material of the material veneer. The log of said-wood was rotary cut in appropriate thickness, and the resulting pieces were put in the order of cutting to prepare the set of the multiple sheets (n sheets) of the material veneers 3 of the same kind of wood with their grains in sequence.

Material veneers 3 had no figures but only with tangential grains 4 by rotary cutting.

-Step 2)-

Material veneers 3 manufactured in Step 1) were embossed with the pair of upper and lower press dies illustrated in FIG. 6 to FIG. 10.

Figure 7:
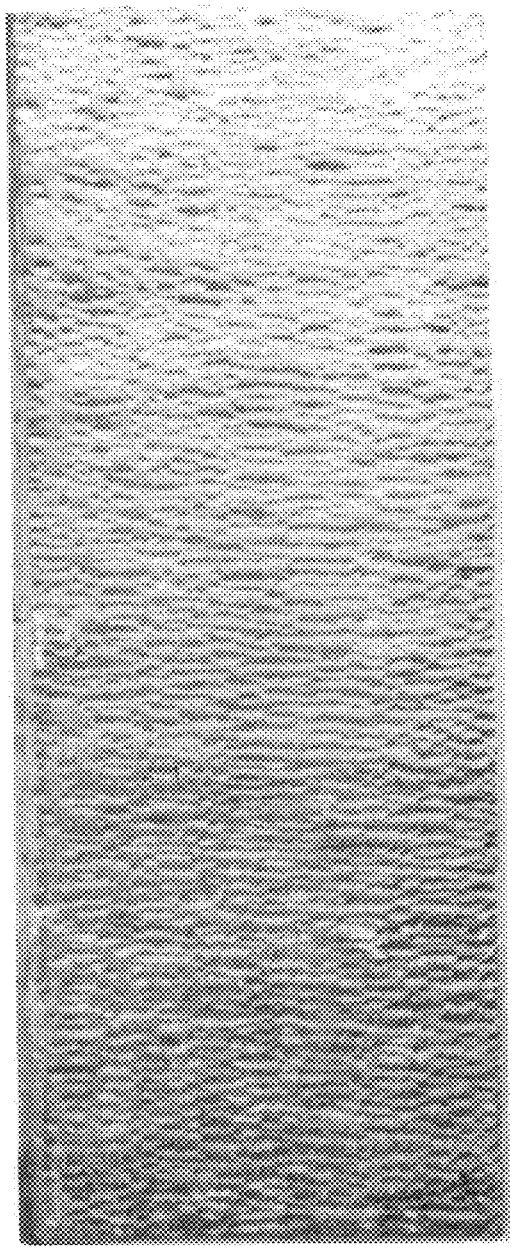
FIG. 7 is a photograph of the surface of the lower die of the press dies used at the embossing of the material veneers in the method according to Example 1.
Figure 6:
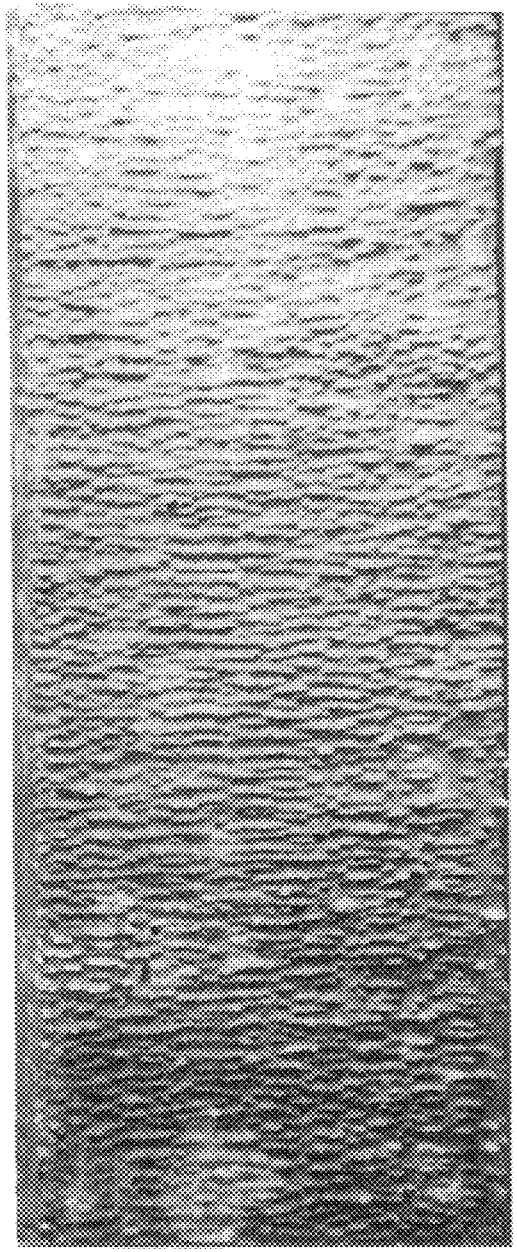
FIG. 6 is a photograph of the surface of the upper die of the press dies used at the embossing of the material veneers in the method according to Example 1.
Figure 8:
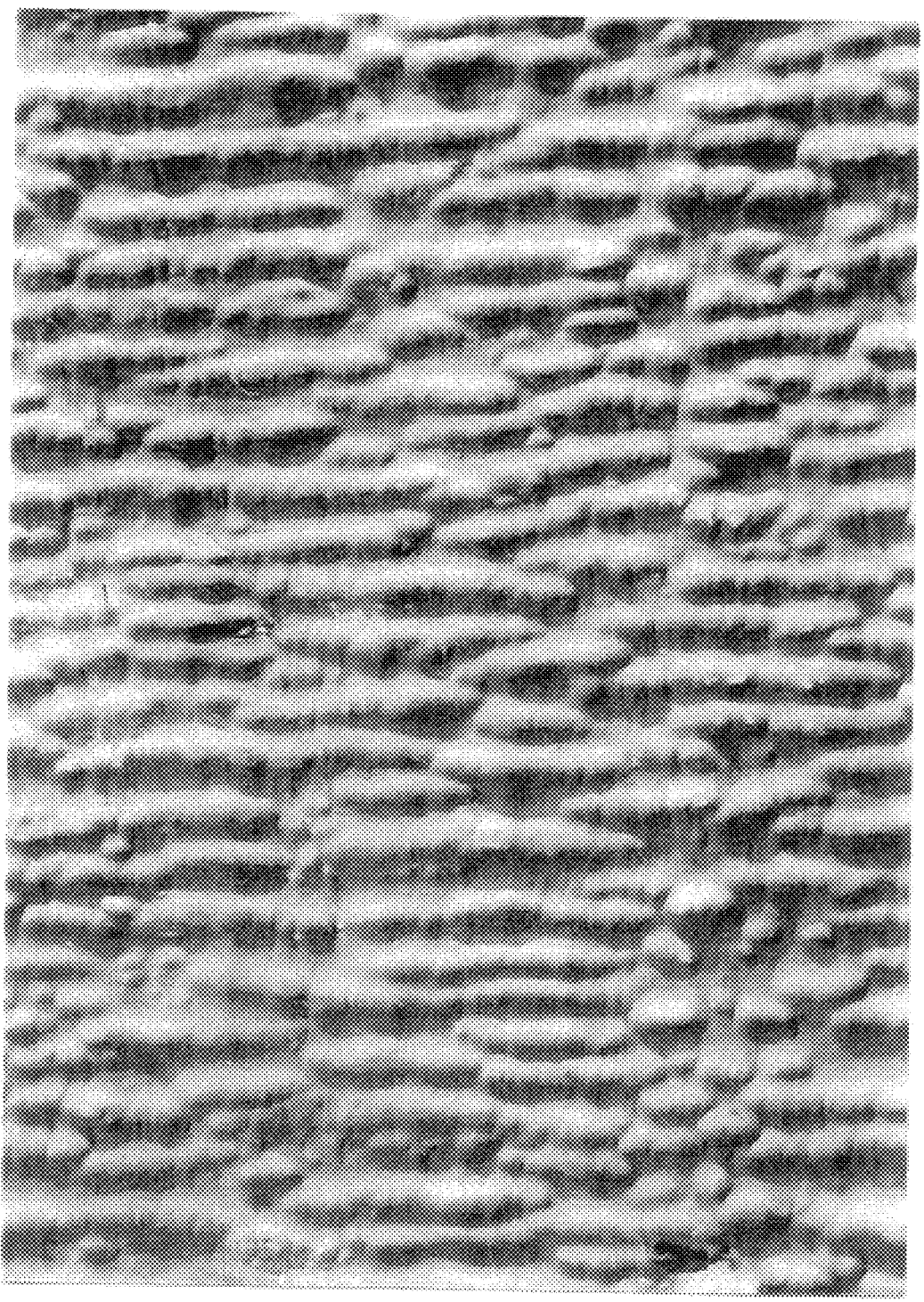
FIG. 8 is a magnified photograph of the upper die of the press dies illustrated by FIG. 6.
Figure 9:
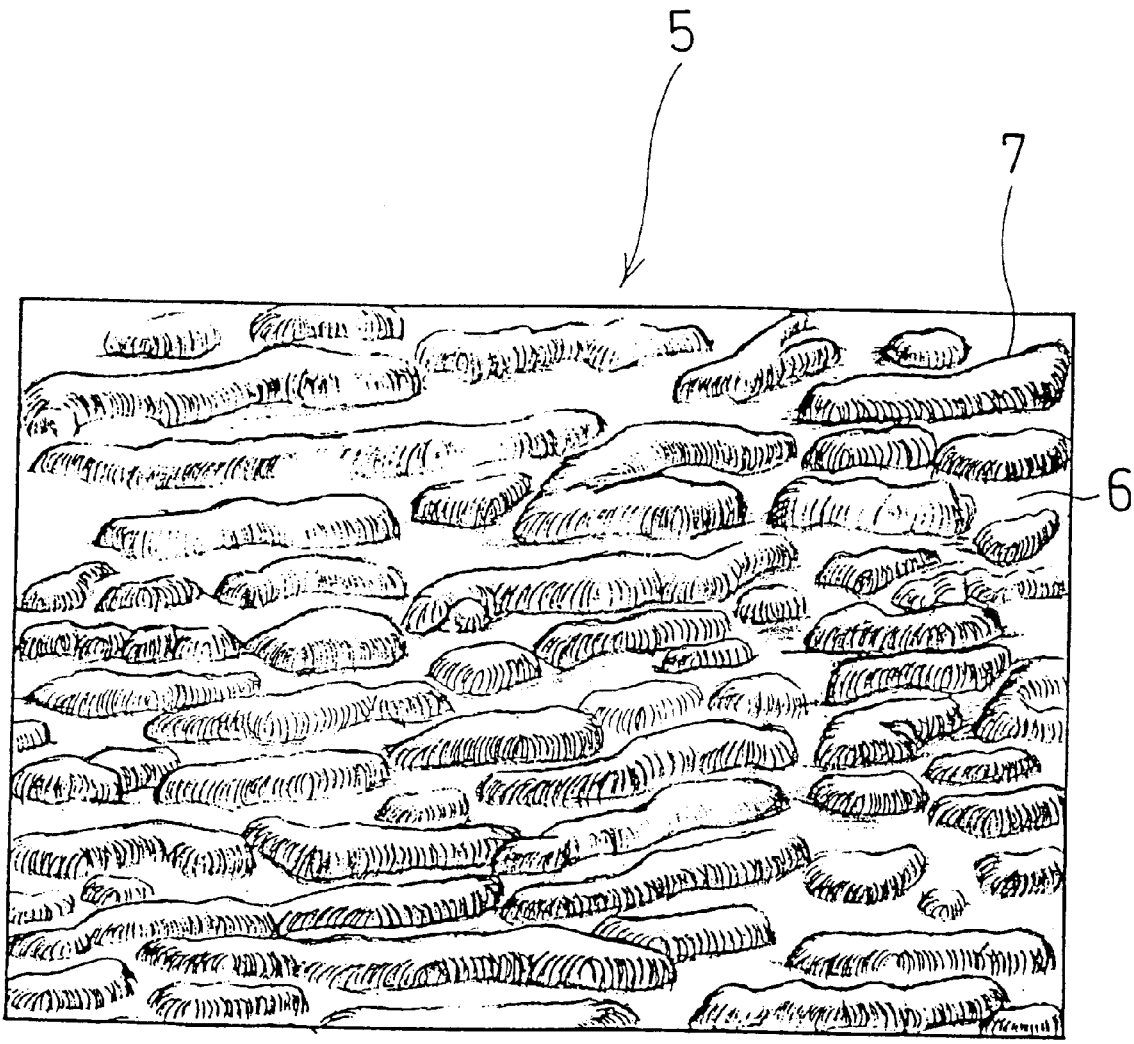
FIG. 9 is a schematic drawing illustrating the upper die of the press dies illustrated by FIG. 6.
Figure 10:
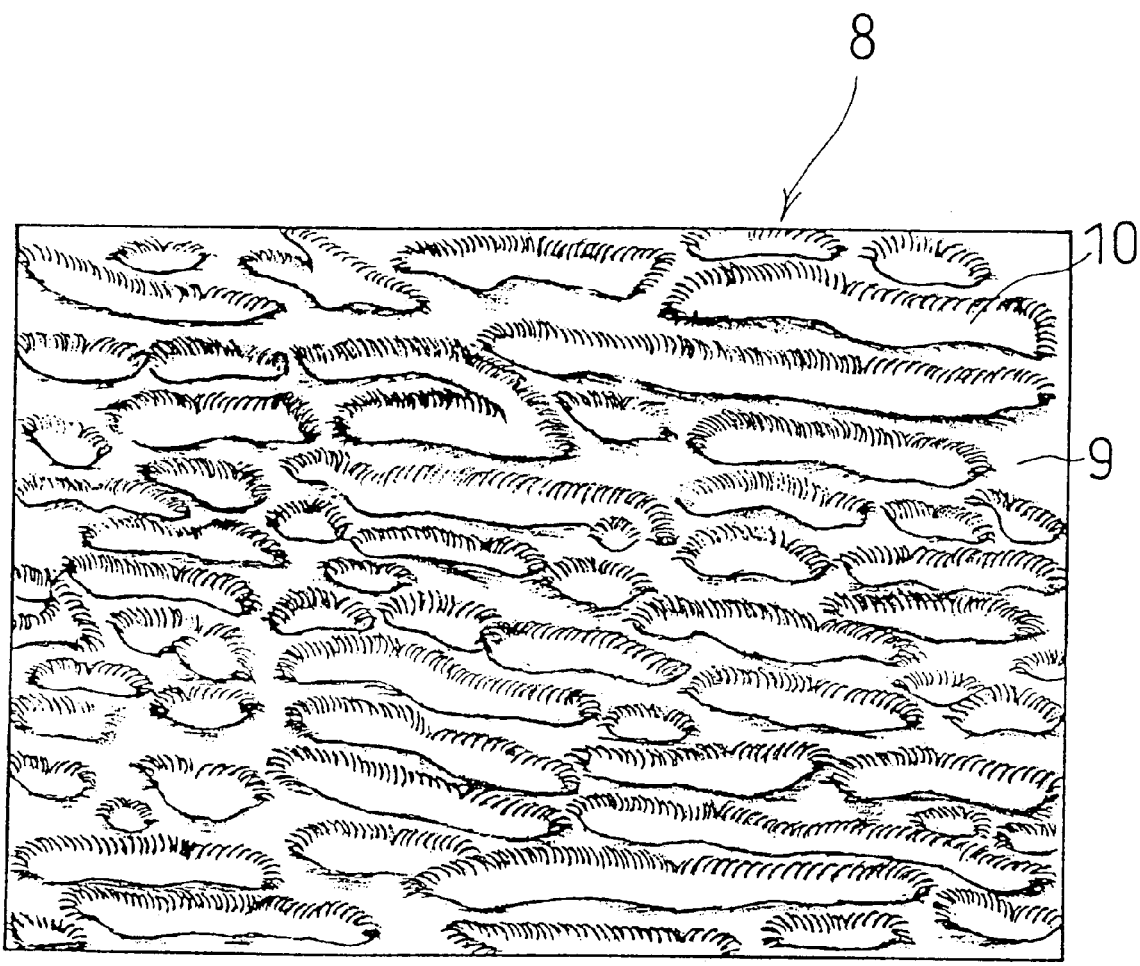
FIG. 10 is a schematic drawing illustrating the lower die of the press dies illustrated by FIG. 7.

As the press dies used for embossing and then pressing of material veneer 3, the press dies composed of the upper die illustrated in FIGS. 6 and 8, and the lower die illustrated in FIG. 7 were used. As shown in FIG. 9, convex patterns 7 (e.g. long island-shape projections) corresponding to the site where is to be a quilted figure in the artificially figured veneer were formed on die face 6 of upper die 5. On the other hand, as shown in FIG. 10, concave patterns 10 (e.g. slender island-shape holes) matching to convex pattern 7 on die face 6 were formed on die face 9 of lower die 8. Further, convex pattern 7 and concave pattern 10 were formed symmetrical to each other.

Then, the number of sheets of material veneer 3 to be embossed simultaneously was determined according to the static bending strength (proportional limit) and specific gravity of material veneer 3. As material veneer 3 made of Manchurian ash had the static bending strength (proportional limit) of 565 $kg/cm^2$ and the specific gravity of 0.55, thus the number of sheets to be embossed simultaneously should be 4–8. Accordingly, it was determined to emboss five material veneers 3 simultaneously.

Figure 11:
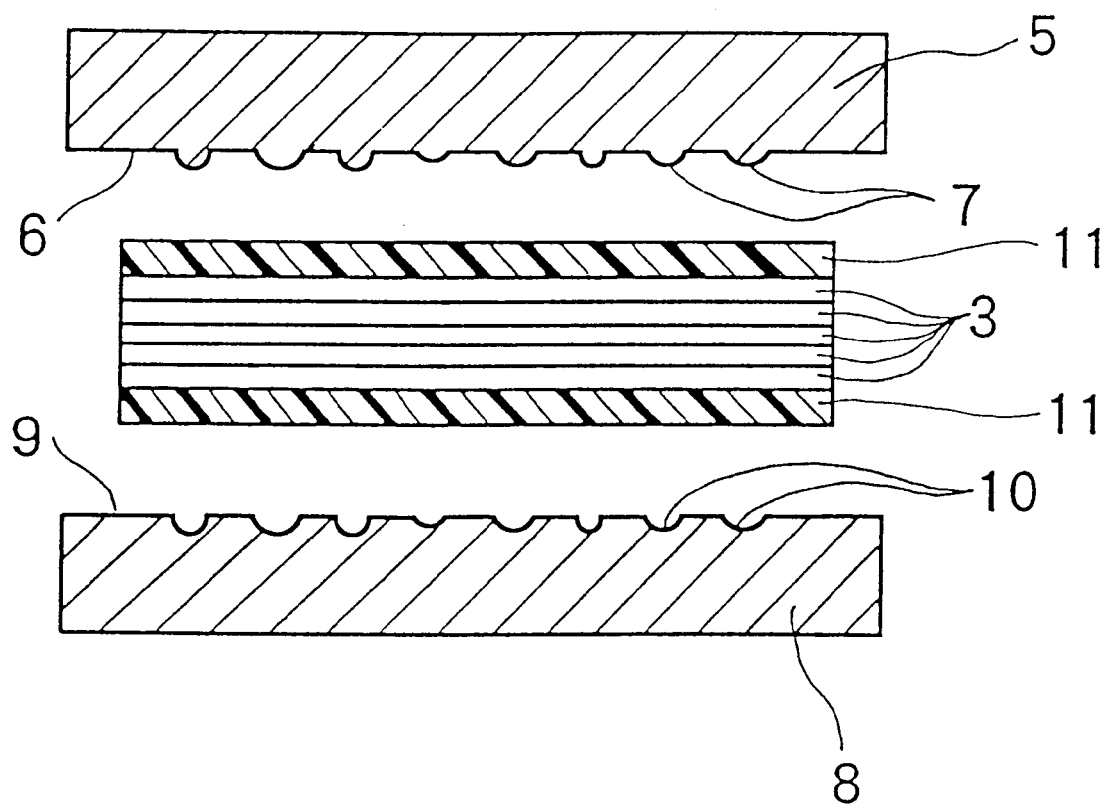
FIG. 11 is a schematic drawing illustrating the step of embossing the material veneers in the method according to Example 1.
Figure 12:
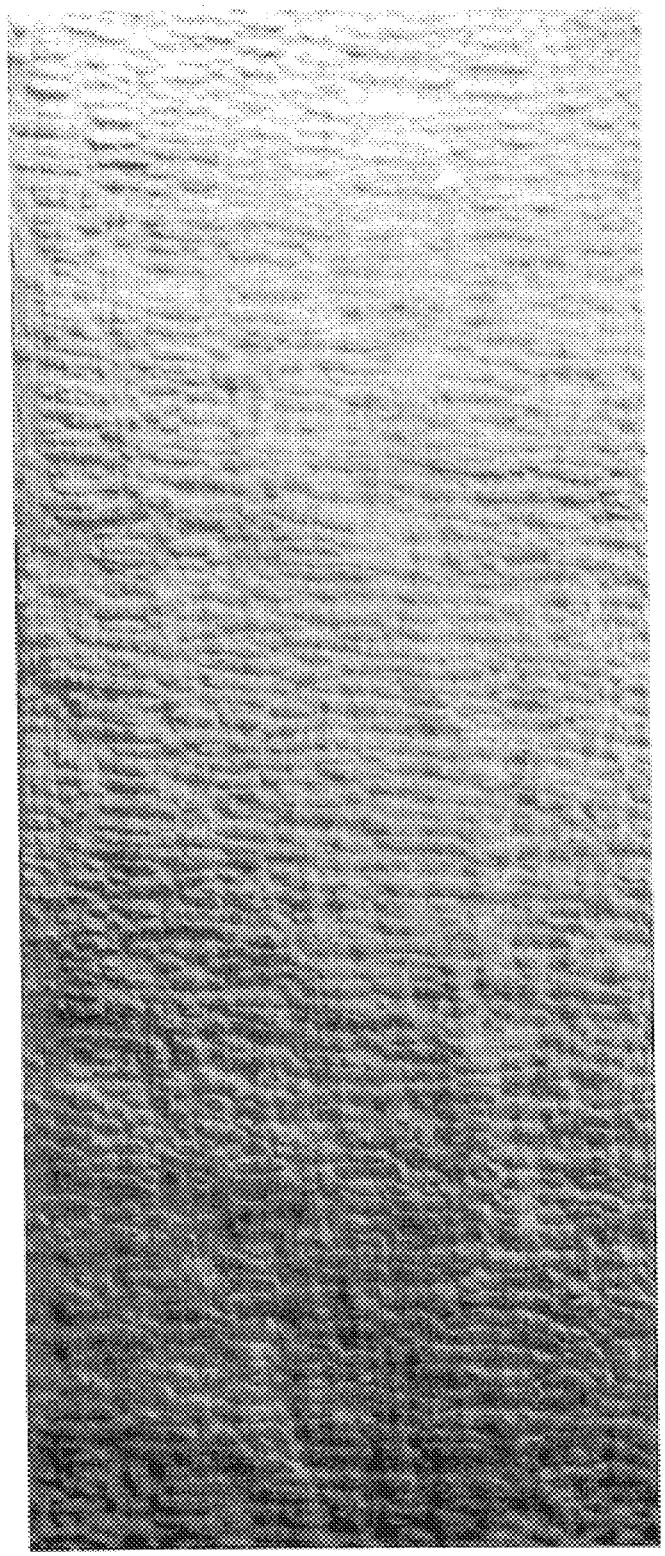
FIG. 12 a photograph of the material veneer embossed in the Method according to Example 1.
Figure 13:
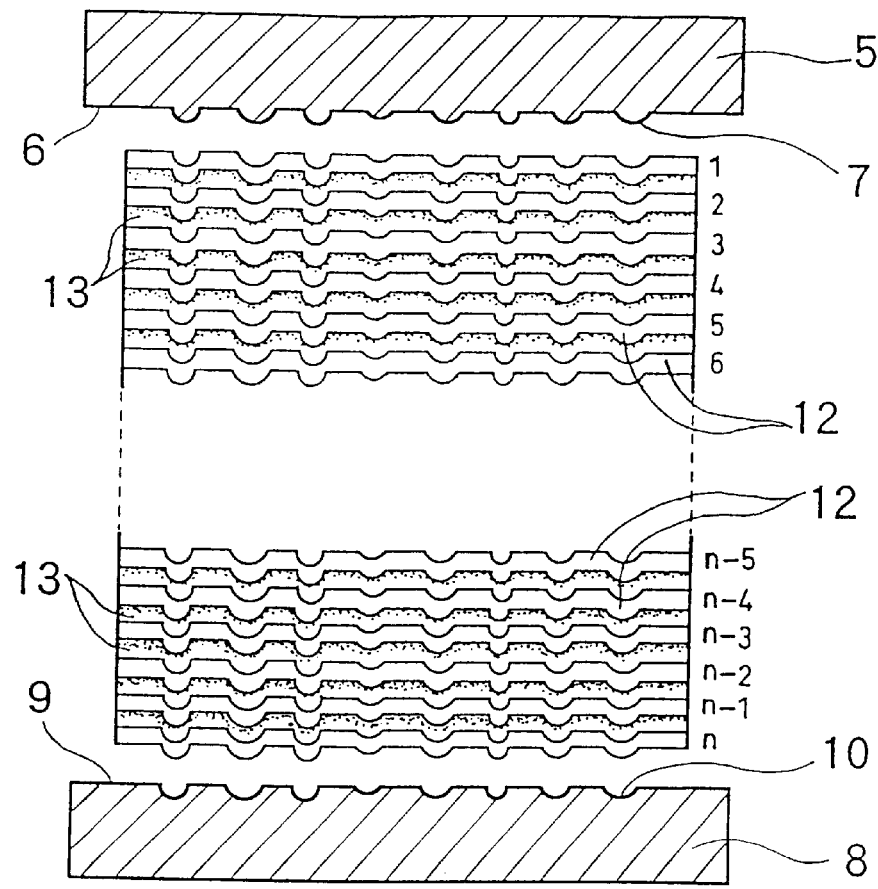
FIG. 13 is a schematic drawing illustrating the step of pressing the laminate embossed through adhesive in the method according to Example 1.

After optionally somewhat wetting five material veneers 3 with water spraying, the set was prepared by stacking material veneers 3 as illustrated in FIG. 11. Further, cushioning materials 11 made of the silicon sheet with thickness of 1 mm were placed on upper side and lower side of the set of material veneers 3 respectively so as to prepare for embossing.

Figure 19:
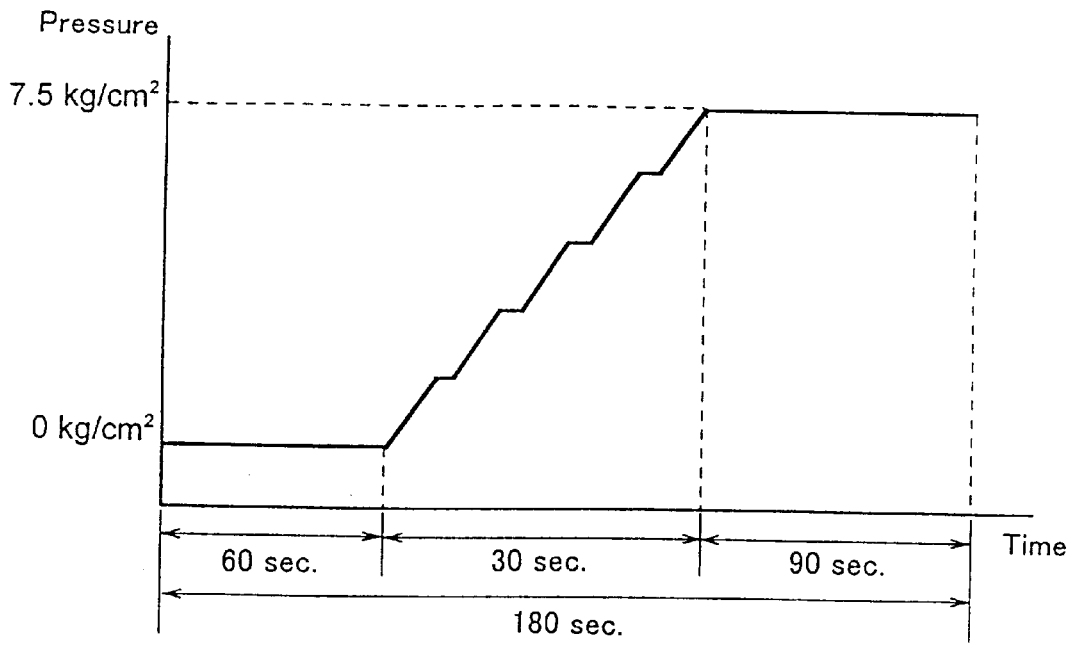
FIG. 19 is a graph showing the relationship between pressure and time at one embodiment of the embossing.

Subsequently, the laminate comprised of five sheets of material veneers 3 and one cushioning material placed on each upper side and lower side was placed between upper die 5 and lower die 8, then hot pressed at the temperature of about 150◻ C. for embossing. The manner in which embossing is carried out is shown in FIG. 19. FIG. 19 is a schematic graph with the ordinate indicating pressure and the abscissa indicating time. The embossing was carried out with the cycle of 180 seconds in total comprised of preheating for 60 seconds without application of pressure at first, then applying the pressure up to 7.5 $kg/cm^2$ through the five-time press in seconds, and maintaining the pressure for 90 seconds. Material veneers 3 with concave-convex patterns on the faces of upper die 5 and lower die 8 were manufactured with this procedure. Such concave-convex patterns formed on each material veneer 3 were uniform for all of five material veneers 3.

By repeating this procedure of embossing, the concave-convex patterns corresponding to the site of the quilted figure were uniformly formed on all of n sheets of material veneer 3.

-Step 3)-

Embossed material veneers 12 were laminated in order of cutting, i.e. 1, 2, . . . n−1, and n such that the grains were sequential and the concave-convex patterns matched. Further, two liquid curing type urethane adhesives 13 (organic solvent type), which were transparent and hard to yellow, were interposed between embossed material veneers 12 in the laminated layer. Curtain flow coater was employed in the application of adhesives 13.

Then, the set of embossed material veneers 12 so laminated and adhered were placed between upper die 5 and lower die 8 of the press die to cold press with the pressure of 15–40 $kg/cm^2$ for 6–12 hours.

-Step 4)-

Figure 14:
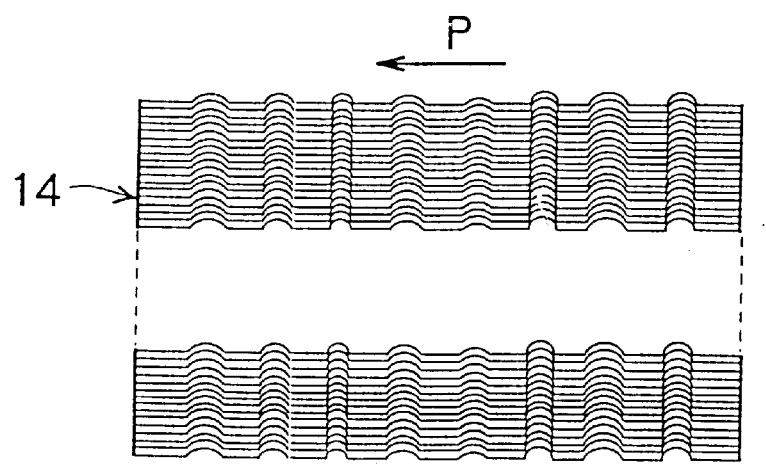
FIG. 14 is a schematic drawing illustrating the laminate pressed in the method according to Example 1.

The laminate 14 obtained by pressing in step 3 was cut with slicer (not shown) in the direction of the normal line of plane of the lamination (the direction of arrow P in FIG. 14) to manufacture the board with desired thickness (thickness of 0.2–0.5 mm).

Figure 15:
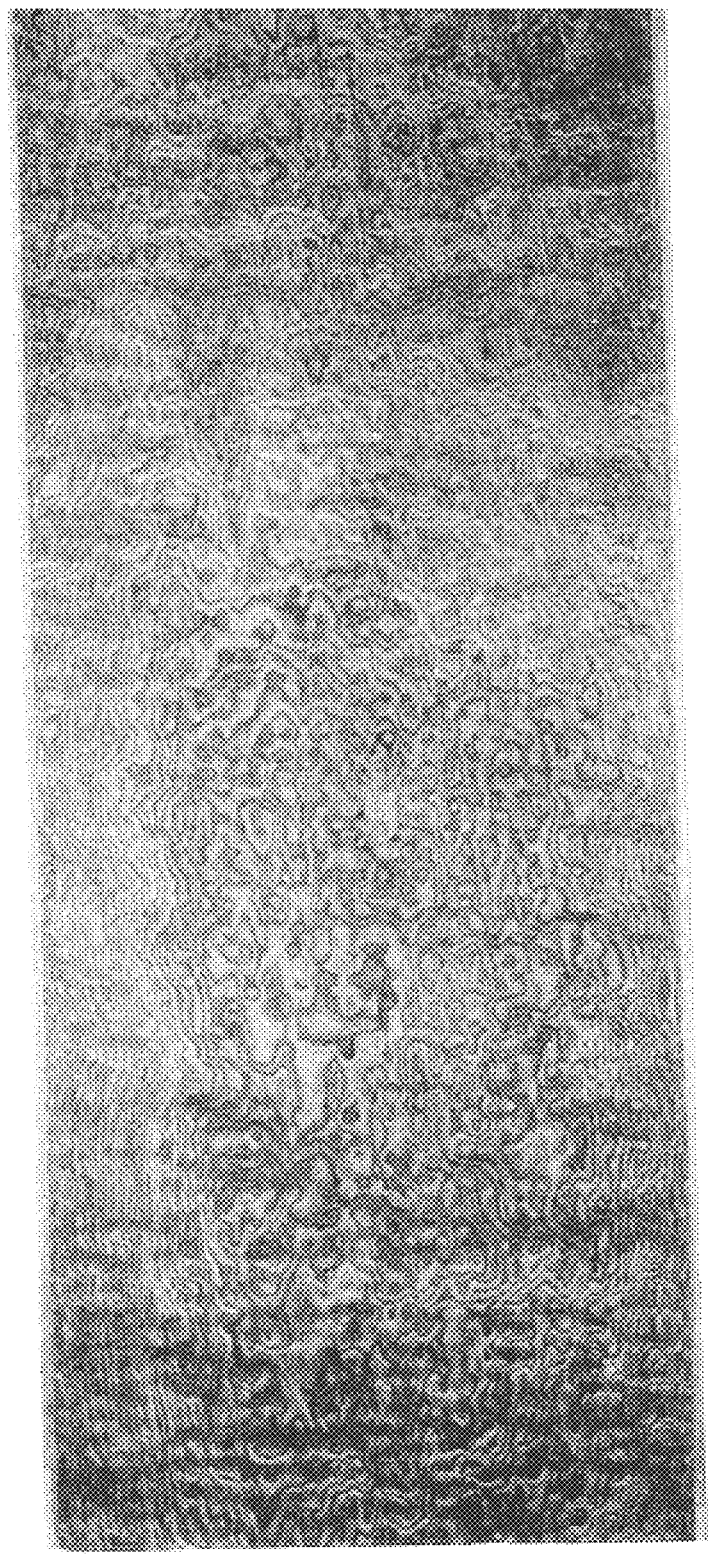
FIG. 15 is a photograph of the surface of the artificially figured veneer with quilted figures manufactured according to the method of Example 1.
Figure 16:
FIG. 16 is a magnified photograph illustrated by FIG. 15.
Figure 17:
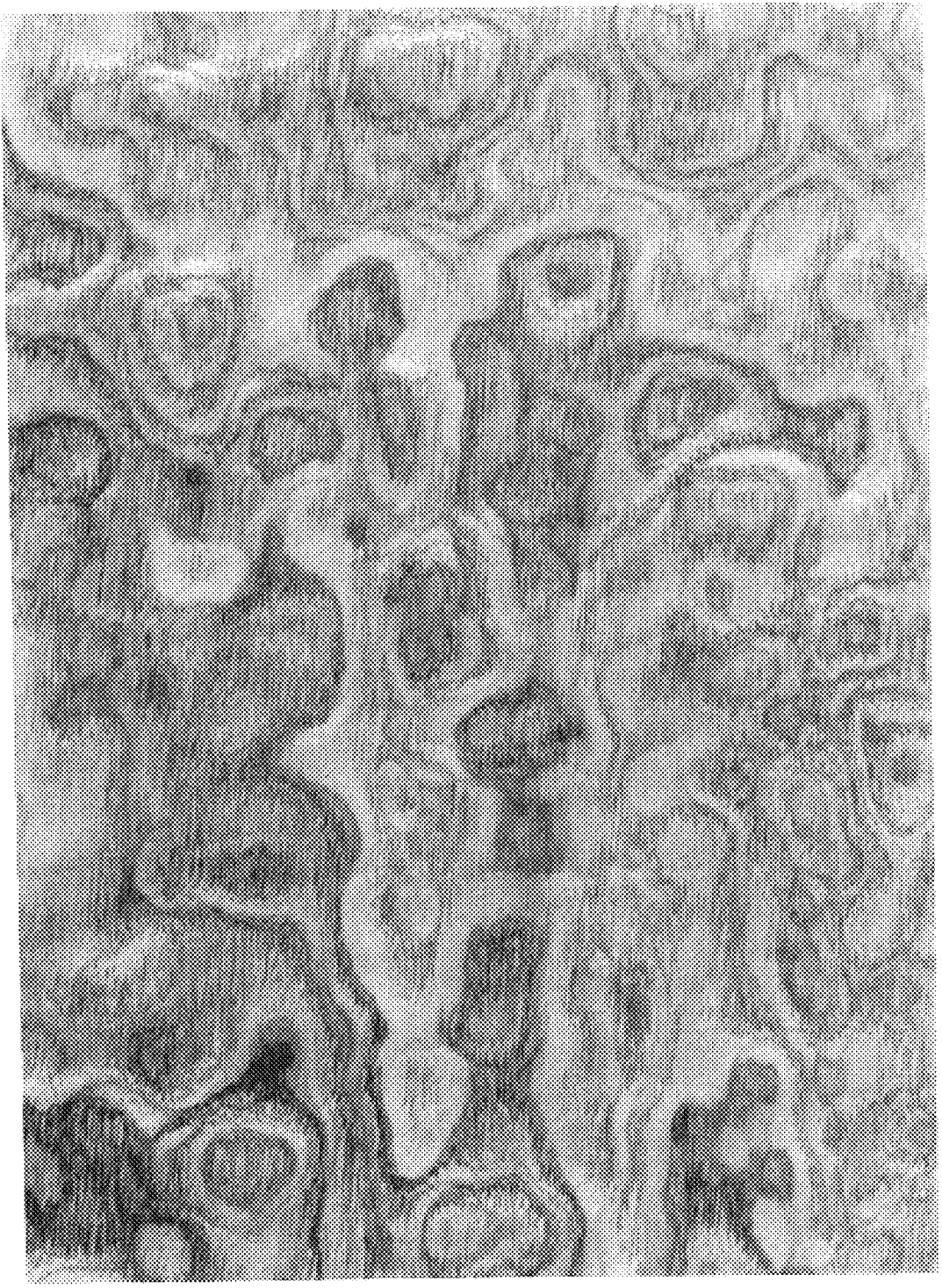
FIG. 17 is a magnified photograph illustrated by FIG. 16.

FIG. 15 to FIG. 17 shows the artificially figured veneer manufactured through step 1) to step 4) described above. From these figures, it is found that, although the wood flitch of Manchurian ash without figures was used as row material, artificially figured veneer 1 so manufactured became one with quilted figures with the grain and texture of a natural wood, and thus could express faithfully Manchurian ash's grain with natural quilted figures.

Example 2

Similar to Example 1, the artificially figured veneer was manufactured from the wood flitch of Bath wood. But embossing was carried out with the one-time press.

The flitch of Bath wood used was with the static bending strength (proportional limit) of 307 kg/cm² and the specific gravity of 0.41, thus four sheets of material veneers were simultaneously embossed.

The Embossed material veneers uniformly exhibited the concave-convex patterns of the press dies on all of four sheets. After pressing and cutting, the artificially figured veneer of Bath wood with faithfully expressed grain with natural quilted figures was manufactured.

Example 3

Similar to Example 1, the artificially figured veneer was manufactured from the wood flitch of Aspen. But embossing was carried out with the five-time press.

The flitch of Aspen used was with the static bending strength (proportional limit) of 360 kg/cm² and the specific gravity of 0.36, thus seven sheets of material veneers were simultaneously embossed.

The Embossed material veneers uniformly exhibited the concave-convex patterns of the press dies on all of seven sheets. After pressing and cutting, the artificially figured veneer of Aspen may be manufactured, which faithfully expressed the grain with natural quilted figures.

Example 4

Similar to Example 1, the artificially figured veneer was manufactured from the wood flitch of African mahogany. But embossing was carried out with the one-time press.

The flitch of African mahogany used was with the static bending strength (proportional limit) of 380 kg/cm² and the specific gravity of 0.53, thus four sheets of material veneers were simultaneously embossed.

The Embossed material veneers uniformly exhibited the concave-convex patterns of the press dies on all of four sheets. After pressing and cutting, the artificially figured veneer of African mahogany with faithfully expressed grain with natural quilted figures was manufactured.

Example 5

Similar to Example 1, the artificially figured veneer was manufactured from the wood flitch of Soft maple. But embossing was carried out with the five-time press.

The flitch of Soft maple used was with the static bending strength (proportional limit) of 500 kg/cm² and the specific gravity of 0.55, thus five sheets of material veneers were simultaneously embossed.

The Embossed material veneers uniformly exhibited the concave-convex patterns of the press dies on all of five sheets. After pressing and cutting, the artificially figured veneer of Soft maple with faithfully expressed grain with natural quilted figures was manufacture.

Example 6

Similar to Example 1, the artificially figured veneer was manufactured from the wood flitch of Makore. But embossing was carried out with the one-time press.

The flitch of Makore used was with the static bending strength (proportional limit) of 480 kg/cm² and the specific gravity of 0.66, thus three sheets of material veneers were simultaneously embossed.

The Embossed material veneers uniformly exhibited the concave-convex patterns of the press dies on all of three sheets. After pressing and cutting, the artificially figured veneer of Makore with faithfully expressed grain with natural quilted figures was manufactured.

Example 7

Figure 20:
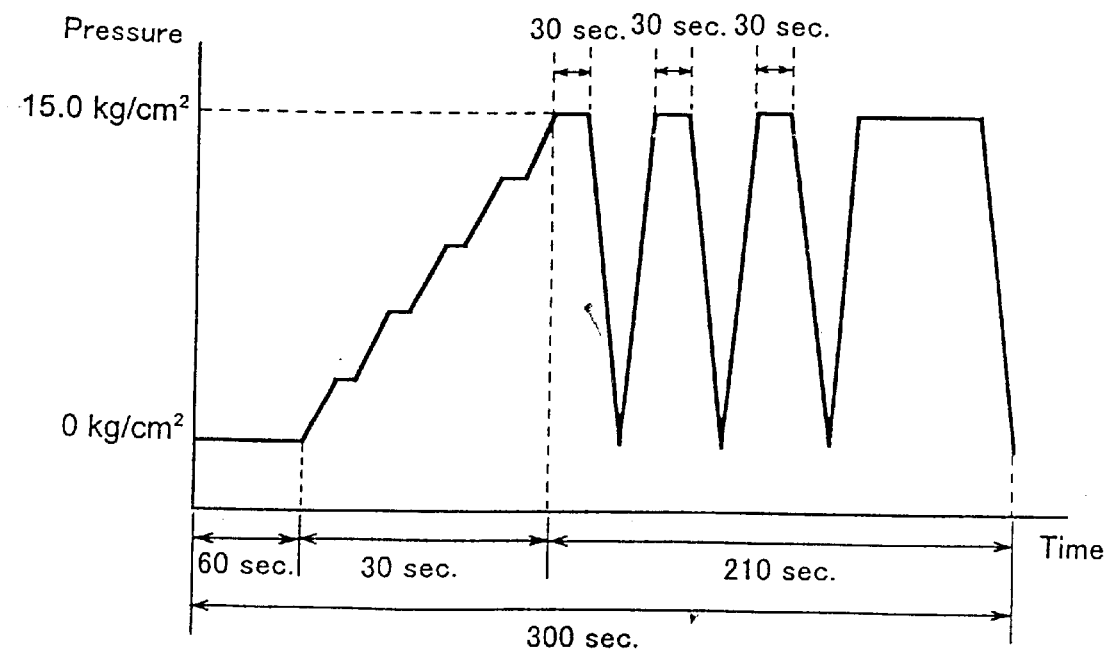
FIG. 20 is a graph showing the relationship between pressure and time at another embodiment of the embossing.
Figure 21:
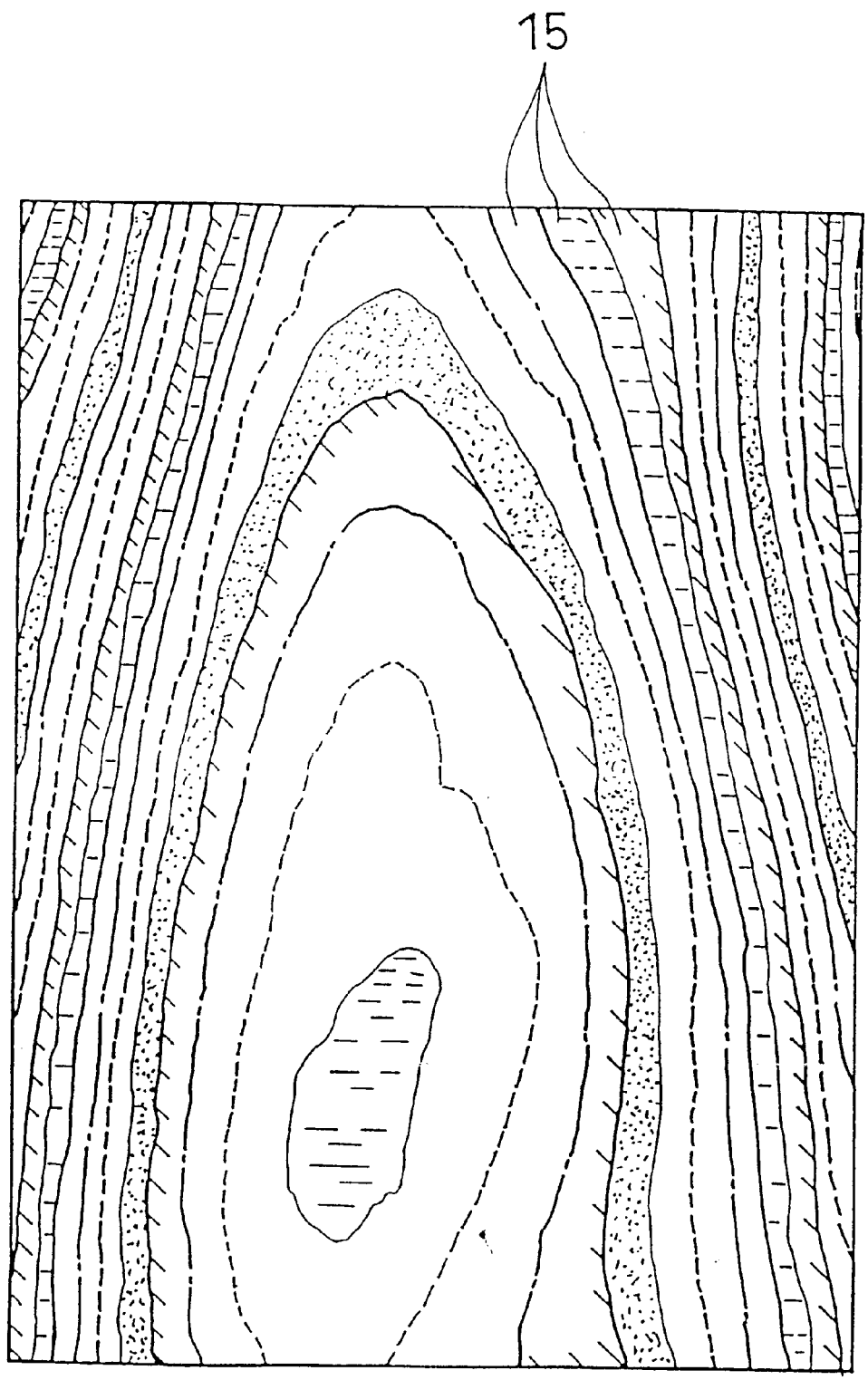
FIG. 21 is a schematic drawing illustrating the typical example of the artificially figured veneer of the prior art.
Figure 22:
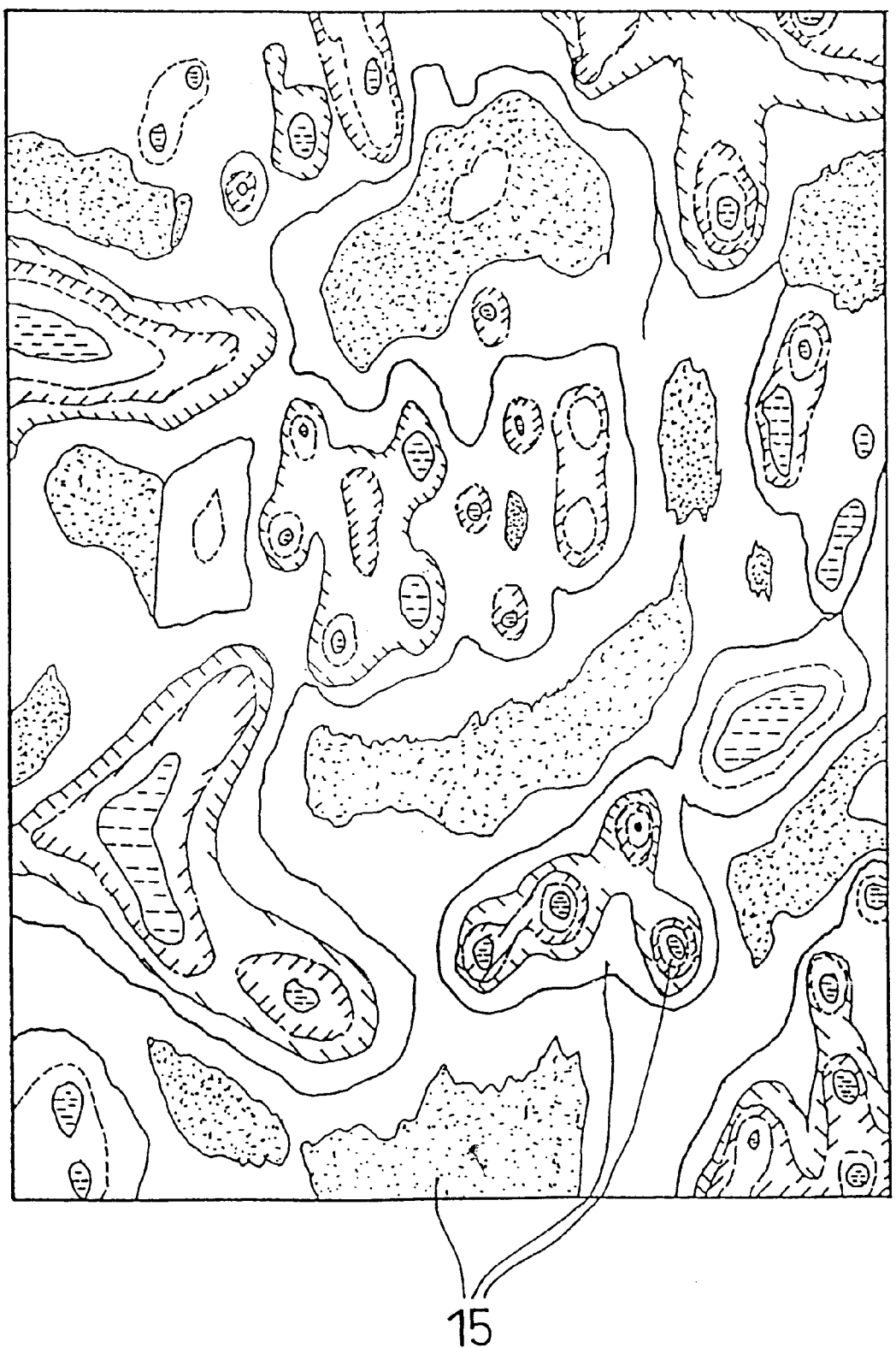
FIG. 22 is a schematic drawing illustrating one example of the artificially figured veneer of the prior art, which has grains similar to those with quilted figures.

Similar to Example 1, the artificially figured veneer was manufactured from the wood flitch of Claro walnut. Since it was known that Claro walnut produced a gas with embossing, embossing was carried out in the manner shown in FIG. 20. FIG. 20 is a schematic graph with the ordinate indicating pressure and the abscissa indicating time. In embossing Claro walnut, preheating for 60 seconds was carried out without application of pressure at first, and then pressure was applied up to 15.0 kg/cm² through the five-time press in 30 seconds. After the pressure was maintained for 30 seconds, the pressure was reduced to 0 kg/cm² to let it breathe, and then pressure was applied up to 15.0 kg/cm² through the one-time press. After the same maintenance, reduction and application of pressure were repeated for twice, pressure was maintained at 15.0 kg/cm², and finally the pressure was reduced to let it breathe again. One cycle comprising of the series of applications and reduction of pressure was 300 seconds.

The flitch of Claro walnut indicated the static bending strength (proportional limit) of 620 kg/cm² and the specific gravity of 0.63, thus four material veneers were simultaneously embossed.

The Embossed material veneers uniformly exhibited the concave-convex patterns of the press dies on all of four sheets. After pressing and cutting, the artificially figured veneer of Claro walnut with faithfully expressed grain with natural quilted figures was manufactured.

Example 8

Similar to Example 1, the artificially figured veneer was manufactured from the wood flitch of Japanese maple. But embossing was carried out with the one-time press.

The flitch of Japanese maple used was with the static bending strength (proportional limit) of 742 kg/cm² and the specific gravity of 0.67, thus five sheets of material veneers were simultaneously embossed.

The Embossed material veneers uniformly exhibited the concave-convex patterns of the press dies on all of five sheets. After pressing and cutting, the artificially figured veneer of Japanese maple with faithfully expressed grain with natural quilted figures was manufactured.

Example 9

Similar to Example 1, the artificially figured veneer was manufactured from the wood flitch of Madrona. But embossing was carried out with the five-time press.

The flitch of Madrona used was with the static bending strength (proportional limit) of 679 kg/cm² and the specific gravity of 0.80, thus two sheets of material veneers were simultaneously embossed.

The Embossed material veneers uniformly exhibited the concave-convex patterns of the press dies about all of two sheets. After pressing and cutting, the artificially figured veneer of Madrona with faithfully expressed grain with natural quilted figures was manufactured.

Example 10

Similar to Example 1, the artificially figured veneer was manufactured from the wood flitch of Bubinga. But embossing was carried out with the one-time press.

The flitch of Bubinga used was with the static bending strength (proportional limit) of 873 kg/cm² and the specific gravity of 0.88, thus four sheets of material veneers were simultaneously embossed.

The Embossed material veneers uniformly exhibited the concave-convex patterns of the press dies on all of four sheets. After pressing and cutting, the artificially figured veneer of Bubinga with faithfully expressed grain with natural quilted figures was manufactured.

As understood from above description, according to the present invention, the artificially figured veneer or artificially figured board with the expression of the grain of natural wood with figures can be certainly manufactured from the natural wood without figures at high productivity. Such artificially figured veneer or artificially figured board can express the figure in very similar form observed in natural woods in addition to normal grain of natural wood. Further, according to the present invention, the time required to emboss a material veneer is shorten to ½–⅛.

What is claimed is:

1. Method of manufacturing an artificially figured veneer or an artificially figured board, comprising the steps of:
   1) preparing a set of multiple sheets of veneer material by rotary cutting a log or repeatedly cutting a wood flitch of a same kind of wood, wherein said multiple sheets have sequential grains;
   2) embossing simultaneously said multiple sheets whose number is determined according to a static bending strength (proportional limit) and specific gravity of the sheets, with a pair of upper and lower press dies respectively having concave-convex patterns corresponding to a site of a figure of a natural wood on a die face of the upper press die and a die face of the lower press die, to form a concave-convex pattern on the sheets;
   3) laminating the set of thus embossed multiple sheets to form a laminate such that the grains of said multiple sheets again become sequential by interposing an adhesive layer between each of the sheets, placing the set between the upper and the lower press dies, and then pressing; and
   4) cutting the laminate obtained in a direction crossing a plane of lamination to manufacture the artificially figured veneer or the artificially figured board with a desired thickness.

2. Method of manufacturing an artificially figured veneer or an artificially figured board according to claim 1, wherein, in step 2, 3–6 sheets are embossed simultaneously when the static bending strength of said sheets is below 330 kg/cm², and 4–10 sheets are embossed simultaneously when the static bending strength of said sheets is above 330 kg/cm² with a specific gravity of said sheets below 0.49.

3. Method of manufacturing an artificially figured veneer or an artificially figured board according to claim 1, wherein, in step 2, 3–6 sheets are embossed simultaneously when the static bending strength of said sheets is below 400 kg/cm², 3–8 sheets are embossed simultaneously when the static bending strength of said sheets is above 400 kg/cm² and below 540 kg/cm², and 4–8 sheets are embossed simultaneously when the static bending strength of said sheets is above 540 kg/cm² with a specific gravity of said sheets above 0.49 and below 0.61.

4. Method of manufacturing an artificially figured veneer or an artificially figured board according to claim 1, wherein, in step 2, 2–5 sheets are embossed simultaneously when the static bending strength of said sheets is below 540 kg/cm², 3–6 sheets are embossed simultaneously when the static bending strength of said sheets is above 540 kg/cm² and below 710 kg/cm², and 3–8 sheets are embossed simultaneously when the static bending strength of said sheets is above 710 kg/cm² with a specific gravity of said sheets above 0.61 and below 0.75.

5. Method of manufacturing an artificially figured veneer or an artificially figured board according to claim 1, wherein, in step 2, 2–3 sheets are embossed simultaneously when the static bending strength of said sheets is below 820 kg/cm², and 2–6 sheets are embossed simultaneously when the static bending strength of said sheets is above 820 kg/cm² with a specific gravity of said sheets above 0.75.

6. Method of manufacturing an artificially figured veneer or an artificially figured board according to claim 1, wherein, in step 2, a pressure is increased continuously up to a predetermined level to emboss the sheets.

7. Method of manufacturing an artificially figured veneer or an artificially figured board according to claim 1, wherein, in step 2, a pressure is increased stepwise up to a predetermined level to emboss the sheets.

8. Method of manufacturing an artificially figured veneer or an artificially figured board according to claim 1, wherein, in step 2, the sheets are embossed with a cushioning material interposed between said sheets and one of said upper or lower press die.

9. Method of manufacturing an artificially figured veneer or an artificially figured board, comprising the steps of:
   1) preparing a set of multiple sheets of veneer material by rotary cutting a log or repeatedly cutting a flitch of wood of a certain family or a certain species, wherein said multiple sheets have similar textures with substantially sequential grains;
   2) embossing simultaneously said multiple sheets whose number is determined according to a static bending strength (proportional limit) and specific gravity of the sheets, with a pair of upper and lower press dies respectively having concave-convex patterns corresponding to a site of a figure of a natural wood on a die face of the upper press die and a die face of the lower press die, to form a concave-convex pattern on the sheets;
   3) laminating the set of thus embossed multiple sheets to form a laminate such that grains of said multiple sheets again become substantially sequential by interposing an adhesive layer between each of the sheets, placing the set between the upper and the lower press dies, and then pressing; and
   4) cutting the laminate obtained in a direction crossing a plane of lamination to manufacture the artificially figured veneer or the artificially figured board with a desired thickness.

10. An artificially figured veneer or an artificially figured board manufactured by the method according to claim 1.

11. An artificially figured veneer or an artificially figured board manufactured by the method according to claim 9.

* * * * *